US009924066B2

(12) United States Patent
Takahashi et al.

(10) Patent No.: US 9,924,066 B2
(45) Date of Patent: Mar. 20, 2018

(54) IMAGE PROCESSING APPARATUS, INFORMATION PROCESSING METHOD, AND PROGRAM

(71) Applicant: CANON KABUSHIKI KAISHA, Tokyo (JP)

(72) Inventors: Katsuyuki Takahashi, Toride (JP); Ryo Kosaka, Tokyo (JP); Soshi Oshima, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/122,650

(22) PCT Filed: Apr. 30, 2015

(86) PCT No.: PCT/JP2015/063537
§ 371 (c)(1),
(2) Date: Aug. 31, 2016

(87) PCT Pub. No.: WO2015/167020
PCT Pub. Date: Nov. 5, 2015

(65) Prior Publication Data
US 2017/0070635 A1    Mar. 9, 2017

(30) Foreign Application Priority Data

May 2, 2014   (JP) .................................. 2014-095535

(51) Int. Cl.
*H04N 1/04*  (2006.01)
*H04N 1/195* (2006.01)
(Continued)

(52) U.S. Cl.
CPC ......... *H04N 1/19594* (2013.01); *G03B 17/54* (2013.01); *G06F 3/01* (2013.01);
(Continued)

(58) Field of Classification Search
CPC .......... H04N 1/19594; H04N 1/00381; H04N 1/00827; H04N 2201/0434;
(Continued)

(56) References Cited

U.S. PATENT DOCUMENTS 7,001,024 B2    2/2006  Kitaguchi et al.
2002/0113946 A1  8/2002  Kitaguchi et al.
(Continued)

FOREIGN PATENT DOCUMENTS

JP    3834766 B2    10/2006
JP    3954436 B2    8/2007
(Continued)

OTHER PUBLICATIONS

International Search Report issued in Intl. Appln. No. PCT/JP2015/063537 dated Jun. 30, 2015.
(Continued)

*Primary Examiner* — Houshang Safaipour
(74) *Attorney, Agent, or Firm* — Rossi, Kimms & McDowell LLP

(57) ABSTRACT

An operability of a user in an image processing apparatus such as a camera scanner is improved. For this purpose, the image processing apparatus has: a pickup image obtaining unit for obtaining a pickup image on a stage through an imaging unit; a distance image obtaining unit for obtaining a distance image on the stage through a solid measuring unit; a detecting unit for detecting the putting of an object on the stage based on the obtained pickup image; a projecting unit for projecting an operation display regarding the reading of the object onto the stage through a projector when the putting of the object is detected; a recognizing unit for recognizing a gesture of the user on the stage based on the obtained distance image; and a reading unit for obtaining a (Continued)

read image of the object in accordance with the gesture to the projected operation display.

18 Claims, 30 Drawing Sheets

(51) Int. Cl.

| | |
|---|---|
| *G06F 3/01* | (2006.01) |
| *G06T 1/00* | (2006.01) |
| *G06F 3/0346* | (2013.01) |
| *G06F 3/042* | (2006.01) |
| *H04N 1/00* | (2006.01) |
| *H04N 5/225* | (2006.01) |
| *G03B 17/54* | (2006.01) |
| *G06T 7/00* | (2017.01) |

(52) U.S. Cl.
CPC ............ *G06F 3/017* (2013.01); *G06F 3/0346* (2013.01); *G06F 3/0426* (2013.01); *G06T 1/00* (2013.01); *G06T 7/0057* (2013.01); *H04N 1/00381* (2013.01); *H04N 1/00827* (2013.01); *H04N 5/225* (2013.01); *G06T 2207/10028* (2013.01); *H04N 2201/0084* (2013.01); *H04N 2201/045* (2013.01); *H04N 2201/0434* (2013.01); *H04N 2201/0436* (2013.01)

(58) Field of Classification Search
CPC ..... H04N 2201/0436; H04N 2201/045; H04N 2201/0084
USPC .......................................................... 358/482
See application file for complete search history.

(56) References Cited

U.S. PATENT DOCUMENTS

2013/0250379 A1* 9/2013 Rigazio .............. H04N 1/19594
358/538
2013/0330006 A1 12/2013 Kuboyama

FOREIGN PATENT DOCUMENTS

| | | |
|---|---|---|
| JP | 4012710 B2 | 11/2007 |
| JP | 2012053545 A | 3/2012 |

OTHER PUBLICATIONS

Written Opinion issued in Intl. Appln. No. PCT/JP2015/063537 dated Jun. 30, 2015.
International Preliminary Report on Patentability issued in International Patent Application No. PCT/JP2015/063537, dated Nov. 17, 2016.

* cited by examiner

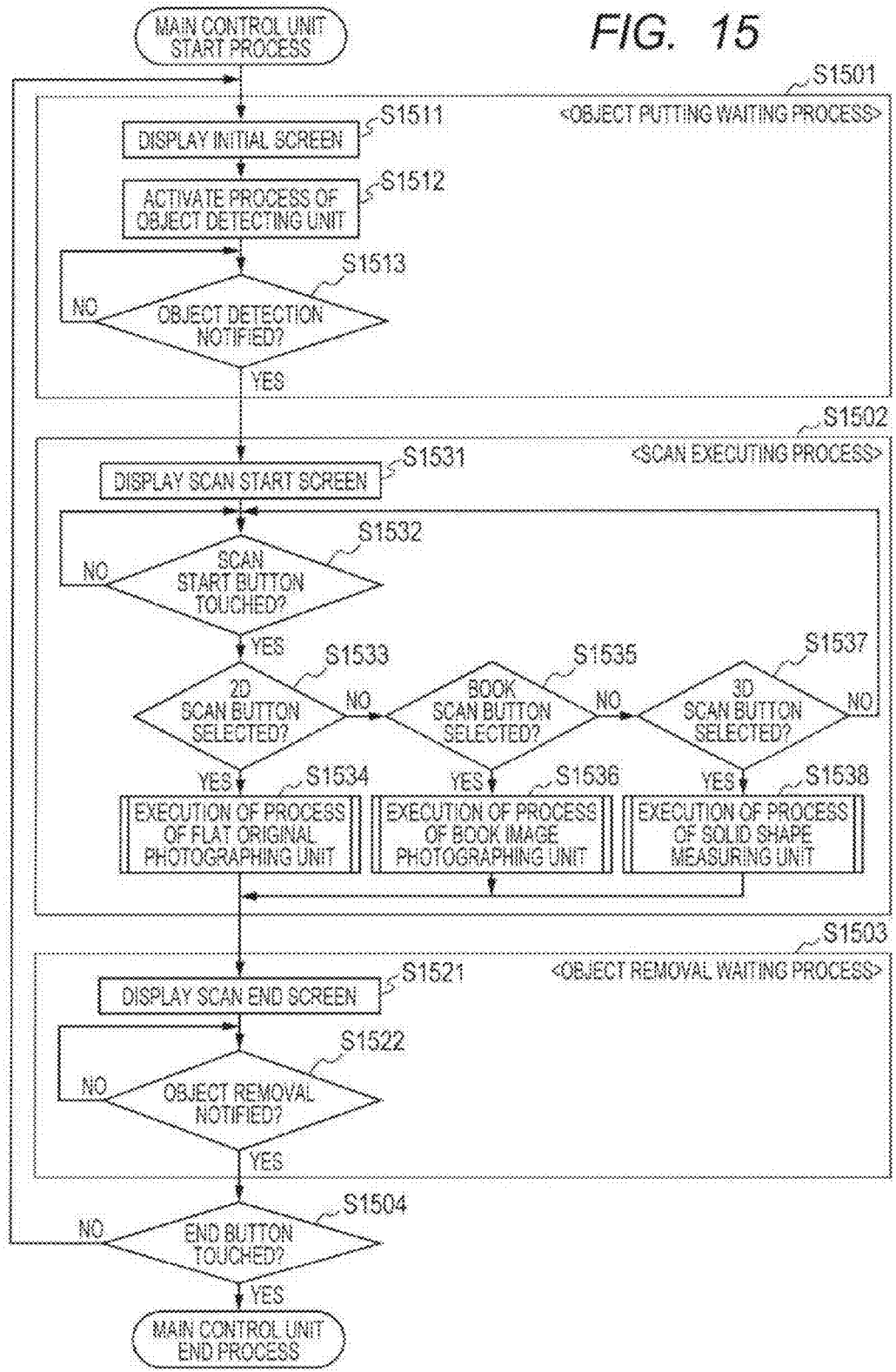

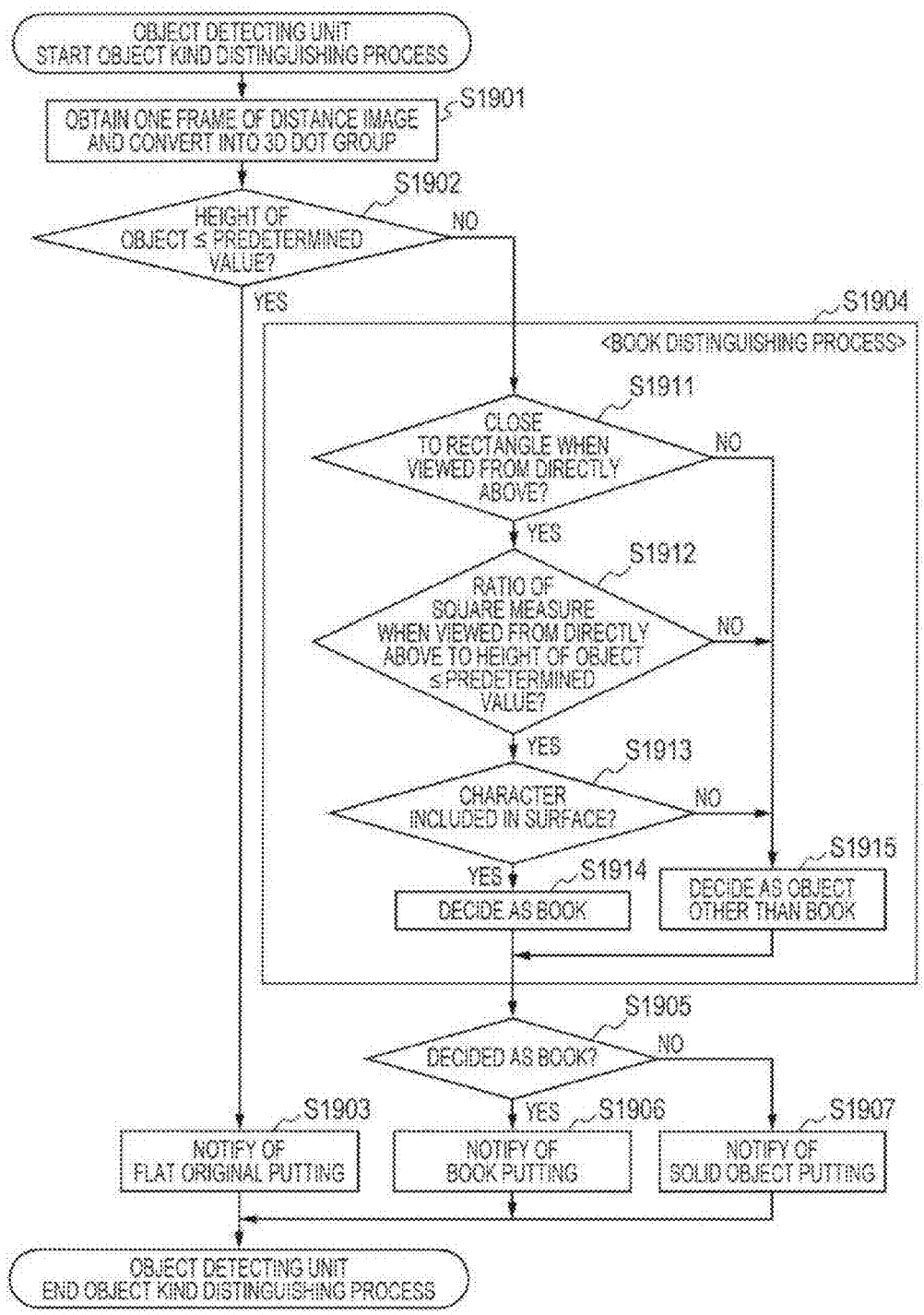

IMAGE PROCESSING APPARATUS, INFORMATION PROCESSING METHOD, AND PROGRAM

TECHNICAL FIELD

The present invention relates to an image processing apparatus, an information processing method, and a program.

BACKGROUND ART

In the related arts, in the case of scanning a document and storing as electronic data, there are: a line scanner using a line sensor for image pickup; and a camera scanner using a 2-dimensional imaging sensor. Particularly, in the case of the camera scanner in which a camera is disposed over a stage (or a bookrest) and an original is put onto the stage in a face-up state and is photographed, so long as a sheet of original, merely by putting the original, it can be soon scanned, and even a thick original such as a book can be easily put onto the stage and can be scanned. Further, a camera scanner in which not only a document such as paper or book but also a solid object is put onto a stage and a solid shape is scanned has been disclosed in PTL 1. According to the camera scanner disclosed in PTL 1, a light projecting unit is provided together with a camera for image pickup, a measurement pattern which is projected from the light projecting unit is photographed by the camera, and a solid shape is measured by a principle of triangular surveying. According to the camera scanner, the solid shape of the object put on the stage is calculated, whether it is a flat original, a book, or a solid object is discriminated, and the photographing is performed in a proper photographing mode in accordance with the discriminated object. According to a camera scanner disclosed in PTL 2, it has a similar construction, a measurement pattern is always projected by a light projecting unit from timing when no object is put on the stage, and the solid shape is continuously measured, thereby detecting that the object has been put on the stage.

On the other hand, according to a user interface system disclosed in PTL 3, a computer display screen is projected onto a desk by a projector and the computer display screen is operated with a fingertip. An infrared camera is used to detect a fingertip. According to the above user interface system, by reading a bar code printed on a paper document, a book, or the like on the desk, a link with electronic information can be generated.

CITATION LISTS

Patent Literatures

PTL 1: Japanese Patent No. 4012710
PTL 2: Japanese Patent No. 3954436
PTL 3: Japanese Patent No. 3834766

SUMMARY OF INVENTION

Technical Problem

However, in the camera scanners of PTL 1 and PTL 2, since a user interface unit is limited, it is difficult to improve an operability to the user. On the other hand, in the user interface system of PTL 3, although an intuitive operation by the fingertip can be performed, a target of an object to be put onto the desk is limited only to a document such as a paper document or book. Therefore, in the user interface system, it is difficult to perform an operation to an object such as a solid object other than the document put on the desk and it is also difficult to perform such dynamic control that the operability is changed in accordance with a feature of a target such as a paper document or book.

It is an object of the invention to improve an operability of the user in an image processing apparatus such as a camera scanner or the like.

Solution to Problem

An image processing apparatus of the invention comprises: a pickup image obtaining unit configured to obtain a pickup image on a stage through an imaging unit; a distance image obtaining unit configured to obtain a distance image on the stage through a solid measuring unit; a detecting unit configured to detect a putting of an object on the stage on the basis of the pickup image obtained by the pickup image obtaining unit; a projecting unit configured to project an operation instruction regarding a reading of the object onto the stage through a projector when the putting of the object is detected by the detecting unit; a recognizing unit configured to recognize a gesture of a user on the stage on the basis of the distance image obtained by the distance image obtaining unit; and a reading unit configured to obtain a read image of the object in accordance with the gesture recognized by the recognizing unit to the operation instruction projected by the projecting unit.

Advantageous Effects of Invention

According to the invention, the operability of the user in the image processing apparatus such as a camera scanner or the like can be improved.

Further features of the present invention will become apparent from the following description of exemplary embodiments with reference to the attached drawings.

BRIEF DESCRIPTION OF DRAWINGS

FIG. 15 is a flowchart illustrating an example of a process of a main control unit of the embodiment 1.

FIG. 19 is a flowchart illustrating an example of a process of an object detecting unit of an embodiment 4.

DESCRIPTION OF EMBODIMENTS

Best modes for embodying the invention will be described hereinbelow by using the drawings.

Embodiment 1

Figure 1:
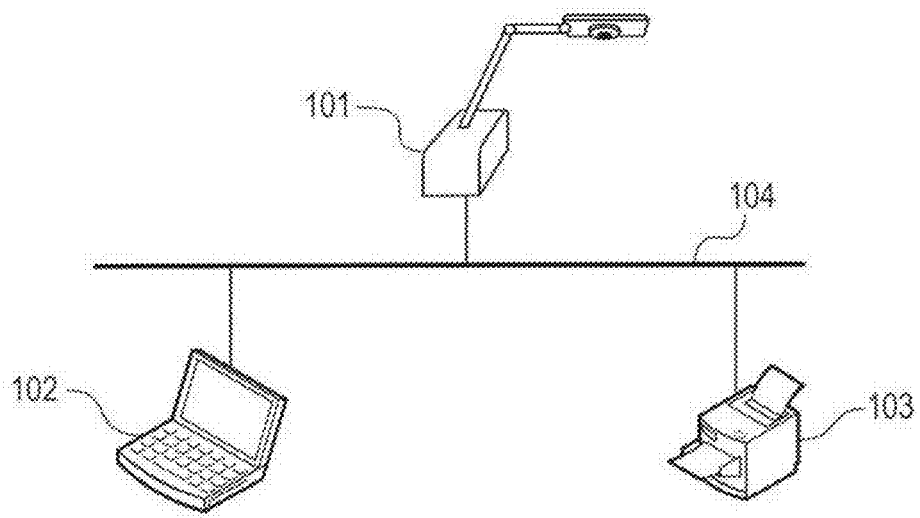
FIG. 1 is a diagram illustrating an example of a system construction.

FIG. 1 is a diagram illustrating an example of a system construction including a camera scanner 101 according to an embodiment.

As illustrated in FIG. 1, the camera scanner 101 is connected to a host computer 102 and a printer 103 by a network 104 such as Ethernet (registered trademark) or the like. The camera scanner 101 is an example of an image processing apparatus. In the system construction of FIG. 1, a scanning function for reading an image from the camera scanner 101 and a printing function for outputting scan data by the printer 103 can be executed by instructions from the host computer 102. The scanning function and the printing function can be also executed by direct instructions to the camera scanner 101 without using the host computer 102.

(Construction of Camera Scanner)

Figure 2A:
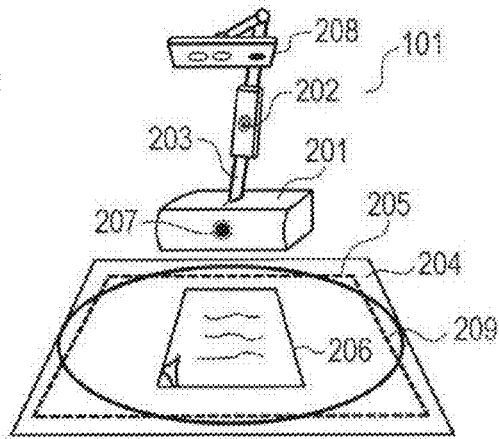
FIGS. 2A, 2B and 2C are diagrams illustrating an example of an external view of a camera scanner.
Figure 2B:
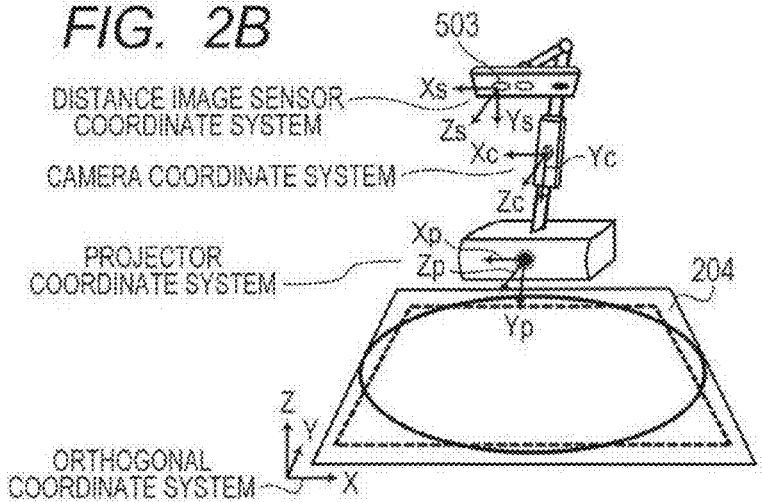
Figure 2C:
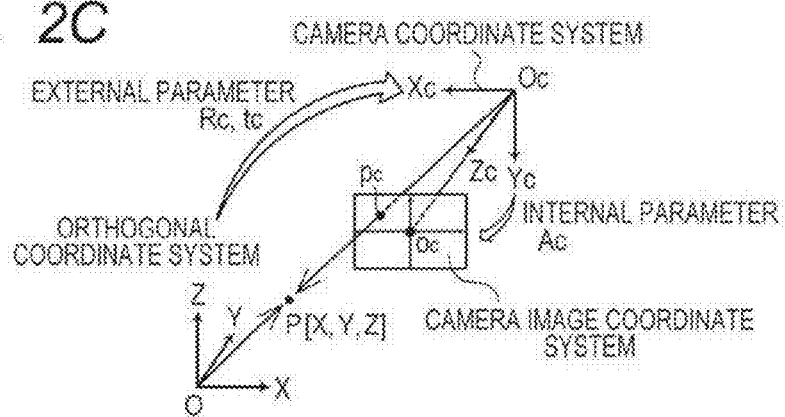

FIGS. 2A to 2C are diagrams illustrating an example of an external view of the camera scanner 101 according to the embodiment.

As illustrated in FIG. 2A, the camera scanner 101 includes a controller unit 201, a camera unit 202, an arm portion 203, a short focus projector 207 (hereinbelow, referred to as a projector 207), and a distance image sensor unit 208. The controller unit 201 serving as a main body of the camera scanner 101, the camera unit 202 to perform an image pickup, the projector 207, and the distance image sensor unit 208 are coupled by the arm portion 203. The arm portion 203 can be bent and extended by using a joint. The camera unit 202 is an example of an imaging unit for obtaining a pickup image. The projector 207 is an example of a projecting unit for projecting an operation display screen (operation display) which is used by the user to operate and will be described hereinafter. The distance image sensor unit 208 is an example of a solid measuring unit for obtaining a distance image.

A stage 204 over which the camera scanner 101 is disposed is also illustrated in FIG. 2A. Lenses of the camera unit 202 and distance image sensor unit 208 are disposed so as to face in the direction of the stage 204 and an image in a reading area 205 surrounded by a broken line can be read. In the example of FIGS. 2A to 2C, since an original 206 has been put in the reading area 205, it can be read by the camera scanner 101. A turntable 209 is disposed in the stage 204. The turntable 209 can be rotated by an instruction from the controller unit 201. An angle between an object (object to be photographed) put on the turntable 209 and the camera unit 202 can be changed.

Although it is assumed that the camera unit 202 picks up an image at a single resolution, it is desirable that a high resolution image pickup and a low resolution image pickup can be performed. Although not shown in FIGS. 2A to 2C, the camera scanner 101 can also further include an LCD touch panel 330 and a speaker 340.

FIG. 2B illustrates a coordinate system in the camera scanner 101. In the camera scanner 101, coordinate systems such as camera coordinate system, distance image coordinate system, and projector coordinate system are defined for each hardware device. In those coordinate systems, an image plane which is photographed by the RGB camera of the camera unit 202 and distance image sensor unit 208 or an image plane which is projected by the projector 207 is defined as an XY plane and a direction which perpendicularly crosses the image plane is defined as a Z direction. Further, in order to enable 3-dimensional data of those independent coordinate systems to be unitedly handled, an orthogonal coordinate system in which a plane including the stage 204 is set to an XY plane and a direction which is upwardly vertical from the XY plane is set to a Z axis is defined.

As an example of the case of converting the coordinate system, relations among the orthogonal coordinate system, a space expressed by using the camera coordinate system in which the camera unit 202 is set to a center, and the image plane which is photographed by the camera unit 202 are illustrated in FIG. 2C. A 3-dimensional dot P[X, Y, Z] in the orthogonal coordinate system can be converted into a 3-dimensional dot $P_c[X_c, Y_c, Z_c]$ in the camera coordinate system by the following equation (1).

$$[X_c, Y_c, Z_c]^T = [R_c | t_c][X, Y, Z, 1]^T \quad (1)$$

Where, $R_c$ and $t_c$ are constructed by an external parameter which is obtained by an attitude (rotation) and a position (translation) of the camera to the orthogonal coordinate system. $R_c$ is called a matrix of revolution of 3×3 and $t_c$ is called a translation vector. On the contrary, the 3-dimensional dot defined by the camera coordinate system can be converted into the orthogonal coordinate system by the following equation (2).

$$[X, Y, Z]^T = [R_c^{-1} | -R_c^{-1} t_c][X_c, Y_c, Z_c, 1]^T \quad (2)$$

Further, the 2-dimensional camera image plane which is photographed by the camera unit 202 is such a plane that 3-dimensional information in a 3-dimensional space has been converted into 2-dimensional information by the camera unit 202. That is, it can be converted by perspective projection converting the 3-dimensional dot $P_c[X_c, Y_c, Z_c]$ in the camera coordinate system into 2-dimensional coordinates $p_c[x_p, y_p]$ on the camera coordinate plane by the following equation (3).

$$\lambda [x_p, y_p, 1]^T = A[X_c, Y_c, Z_c]^T \quad (3)$$

Where, A is called an internal parameter of the camera and is a matrix of 3×3 expressed by a focal distance, an image center, and the like.

As mentioned above, by using the equations (1) and (3), a 3-dimensional dot group expressed by the orthogonal coordinate system can be converted into the 3-dimensional dot group coordinates in the camera coordinate system or the camera image plane. It is assumed that the internal parameter of each hardware device and the position attitude (external parameter) to the orthogonal coordinate system have previously been calibrated by a well-known calibration method. Hereinbelow, the 3-dimensional dot group expresses 3-dimensional data (solid data) in the orthogonal coordinate system unless otherwise specified.

(Hardware Construction of Controller of Camera Scanner)

Figure 3:
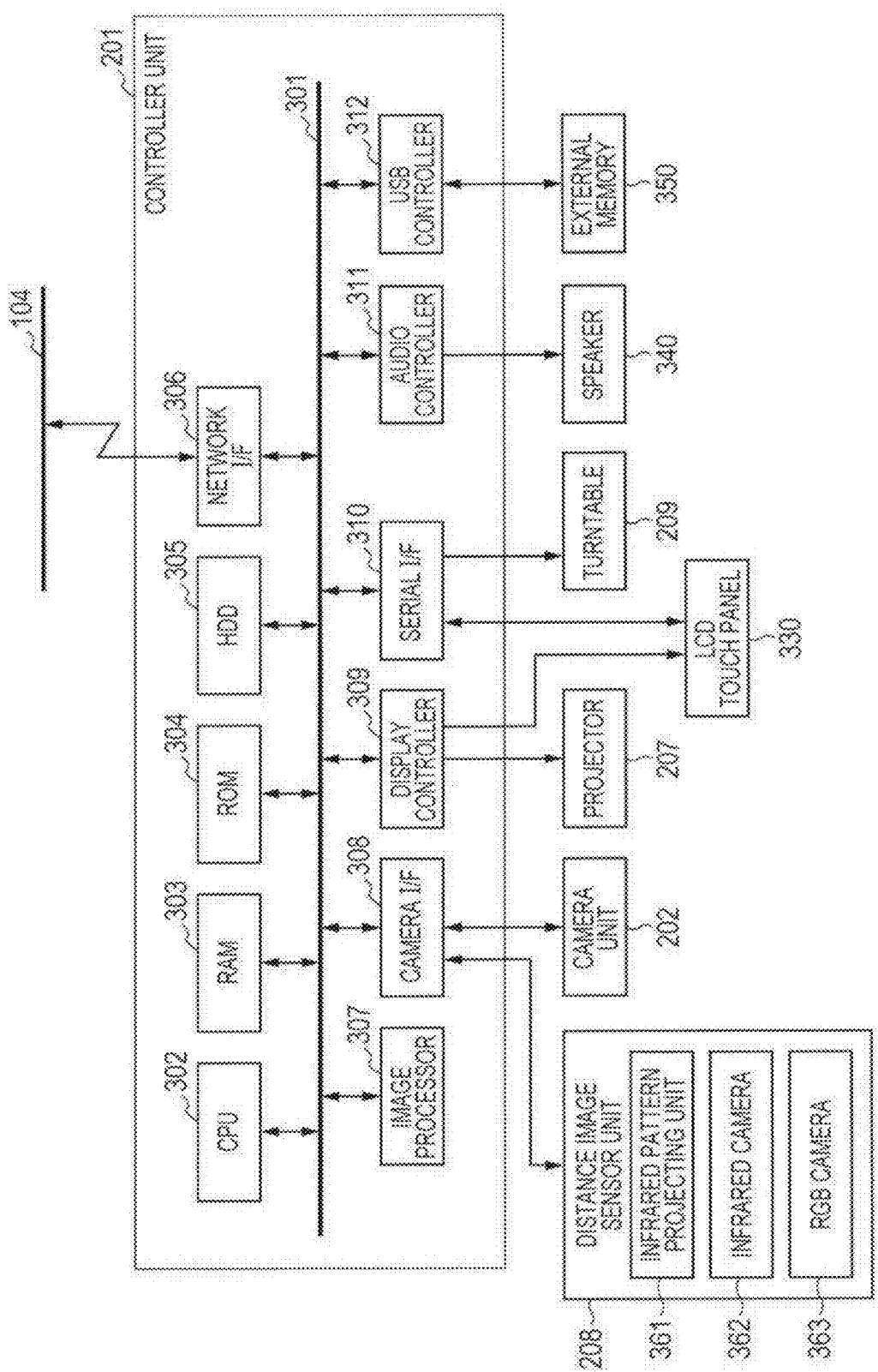
FIG. 3 is a diagram illustrating an example of a hardware construction of the camera scanner.

FIG. 3 is a diagram illustrating an example of a hardware construction such as a controller unit 201 serving as a main body of the camera scanner 101, and the like.

As illustrated in FIG. 3, the controller unit 201 includes a CPU 302, a RAM 303, a ROM 304, an HDD 305, a network I/F 306, an image processor 307, a camera I/F 308, a display controller 309, a serial I/F 310, an audio controller 311, and a USB controller 312 connected to a system bus 301. The CPU 302 is a central processing unit for controlling the operation of the whole controller unit 201. The RAM 303 is a volatile memory. The ROM 304 is a non-volatile memory in which a program for activating the CPU 302 has been stored. The HDD 305 is a hard disk drive (HDD) having a capacity larger than that of the RAM 303. A program for controlling the camera scanner 101 which is executed by the controller unit 201 has been stored in the HDD 305. The CPU 302 executes the program stored in the ROM 304 or HDD 305, so that the functional construction of the camera scanner 101 and processes (information processes) of flowcharts, which will be described hereinafter, are realized.

Upon activation such as power-on or the like, the CPU 302 executes the activating program stored in the ROM 304. The activating program is used by the CPU 302 to read out the controlling program stored in the HDD 305 and to develop into the RAM 303. When the activating program is executed, the CPU 302 subsequently executes the controlling program developed in the RAM 303 and makes control. The CPU 302 also stores data which is used in the operation according to the controlling program into the RAM 303 and reads out and writes it. Various kinds of settings necessary for the operation according to the controlling program and image data generated by a camera input can be further stored in the HDD 305 and is read out and written by the CPU 302. The CPU 302 communicates with another equipment on the network 104 through the network I/F 306.

The image processor 307 reads out the image data stored in the RAM 303, processes it, and writes back into the RAM 303. Image processes which are executed by the image processor 307 are a rotation, a zoom, a color conversion, and the like.

The camera I/F 308 is connected to the camera unit 202 and the distance image sensor unit 208, obtains the image data from the camera unit 202, obtains the distance image data from the distance image sensor unit 208, and writes into the ROM 303 in response to instructions from the CPU 302. The camera I/F 308 transmits a control command from the CPU 302 to the camera unit 202 and the distance image sensor unit 208 and performs settings of the camera unit 202 and the distance image sensor unit 208.

The controller unit 201 can further include at least one of the display controller 309, serial I/F 310, audio controller 311, and USB controller 312. The display controller 309 controls a display of the image data to a display in response to an instruction from the CPU 302. In this instance, the display controller 309 is connected to the projector 207 and the LCD touch panel 330.

The serial I/F 310 inputs and outputs a serial signal. In this instance, the serial I/F 310 is connected to the turntable 209 and transmits instructions of a start/end of the rotation and an angle of the rotation from the CPU 302 to the turntable 209. The serial I/F 310 is also connected to the LCD touch panel 330. When the LCD touch panel 330 is depressed, the CPU 302 obtains coordinates of the depressed position through the serial I/F 310.

The audio controller 311 is connected to the speaker 340, converts audio data into an analog audio signal in response to an instruction from the CPU 302 and outputs an audio sound through the speaker 340.

The USB controller 312 controls an externally attached USB device in response to an instruction from the CPU 302. In this instance, the USB controller 312 is connected to an external memory 350 such as a USB memory, SD card, or the like and reads/writes data from/into the external memory 350.

(Functional Construction of Camera Scanner)

Figure 4A:
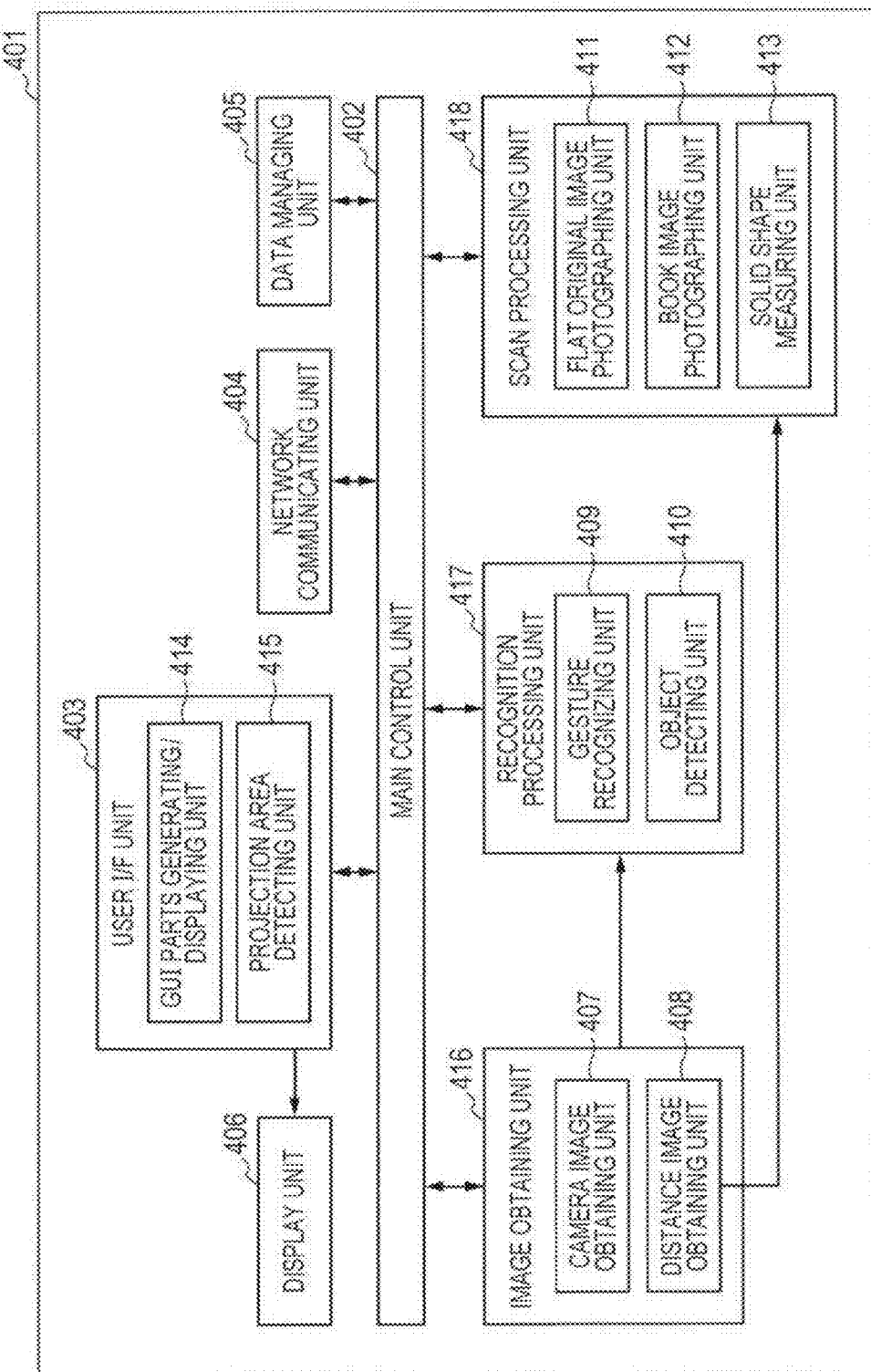
FIGS. 4A and 4B are diagrams illustrating an example of a functional construction and the like of the camera scanner.
Figure 4B:
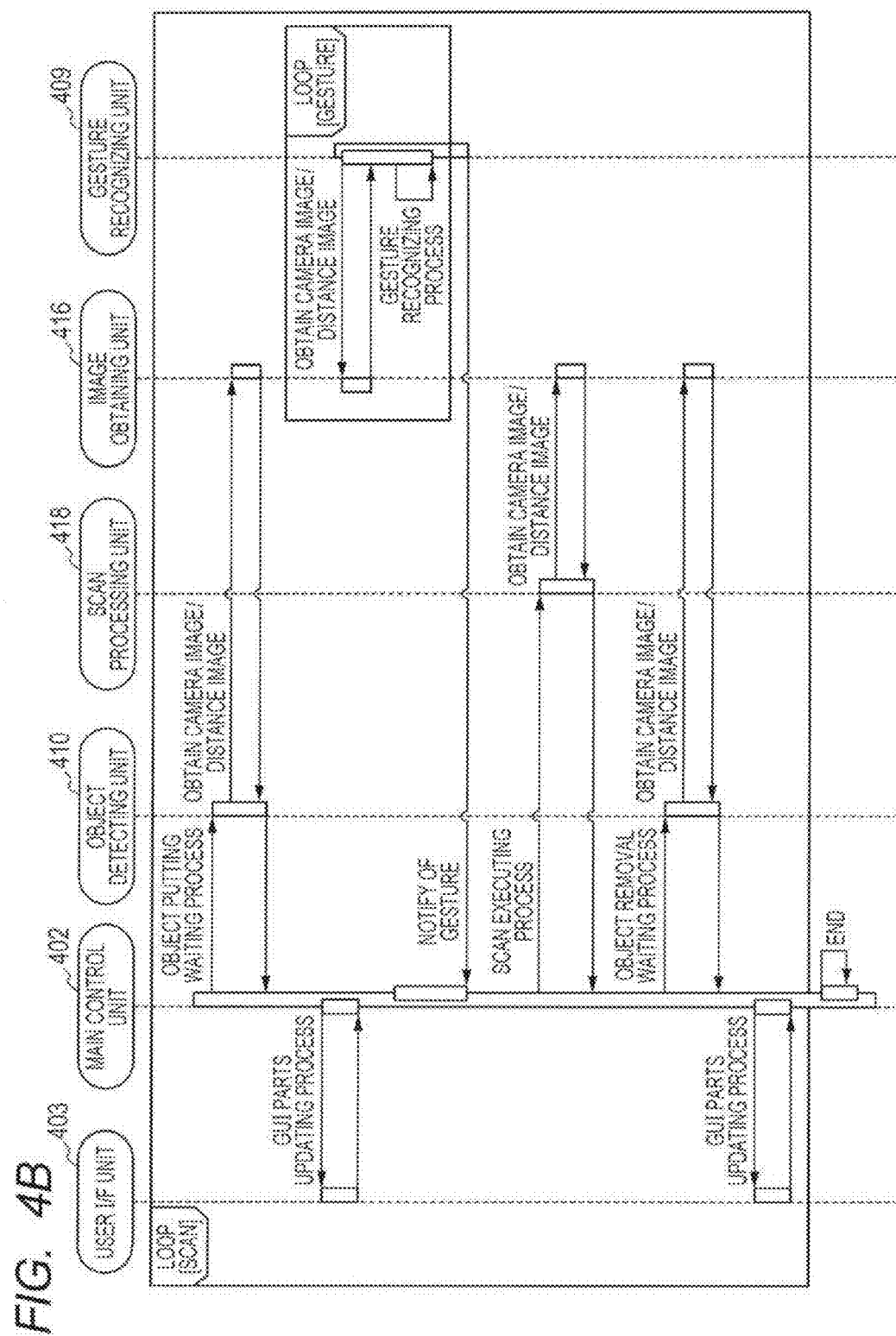

FIG. 4A is a diagram illustrating an example of a functional construction 401 of the camera scanner 101 which is realized when the CPU 302 executes the controlling program. FIG. 4B is a sequence diagram illustrating relations among respective modules of the functional construction 401.

As mentioned above, the controlling program of the camera scanner 101 is stored in the HDD 305 and is developed into the RAM 303 and executed by the CPU 302 upon activation.

A main control unit 402 is a center of the control and controls each of other modules in the functional construction 401 as illustrated in FIG. 4B.

An image obtaining unit 416 is a module for executing an image inputting process and is constructed by a camera image obtaining unit 407 and a distance image obtaining unit 408. The camera image obtaining unit 407 obtains the image data output from the camera unit 202 through the camera I/F 308 and stores into the RAM 303 (pickup image obtaining process). The distance image obtaining unit 408 obtains the distance image data output from the distance image sensor unit 208 through the camera I/F 308 and stores into the RAM 303 (distance image obtaining process). Details of the process of the distance image obtaining unit 408 will be described hereinafter by using FIGS. 5A to 5D.

A recognition processing unit 417 is a module for detecting a motion of an object on the stage 204 from the image data obtained by the camera image obtaining unit 407 and the distance image obtaining unit 408 and recognizing and is constructed by a gesture recognizing unit 409 and an object detecting unit 410. The gesture recognizing unit 409 continuously obtains the image on the stage 204 from the image obtaining unit 416. When a gesture such as a touch or the like is detected, the gesture recognizing unit 409 notifies the main control unit 402 of it. When a notification of an object putting waiting process or an object removal waiting process is received from the main control unit 402, the object detecting unit 410 obtains the image derived by photographing the stage 204 from the image obtaining unit 416. The object detecting unit 410 executes a process for detecting timing when the object is put onto the stage 204 and rests or timing when the object is removed. Details of the processes of the gesture recognizing unit 409 and the object detecting unit 410 will be described hereinafter by using FIGS. 6 to 8C, respectively.

A scan processing unit 418 is a module for actually scanning a target and is constructed by a flat original image photographing unit 411, a book image photographing unit 412, and a solid shape measuring unit 413. Each of the flat original image photographing unit 411, the book image photographing unit 412, and the solid shape measuring unit 413 executes a proper process (reading process) to a flat original, a book, or a solid object and outputs data (read image) of a format according to each object. Details of the processes of those modules will be described hereinafter by using FIGS. 9 to 14F, respectively.

A user interface unit 403 is constructed by a GUI parts generating/display unit 414 and a projection area detecting unit 415. The GUI parts generating/display unit 414 receives a request from the main control unit 402 and generates GUI parts such as message, button, and the like. The GUI parts mentioned here are an example of objects constructing the operation display. The GUI parts generating/display unit 414 requests a display of the generated GUI parts to a display unit 406. A display position of the GUI parts on the stage 204 is detected by the projection area detecting unit 415.

The display unit 406 displays the requested GUI parts to the projector 207 or the LCD touch panel 330 through the display controller 309. Since the projector 207 is disposed so as to face the stage 204, it can project the GUI parts onto the stage 204. The user interface unit 403 receives a gesture operation such as a touch or the like recognized by the gesture recognizing unit 409 or an inputting operation from the LCD touch panel 330 through the serial I/F 310, and further, their coordinates. The user interface unit 403 discriminates the operation contents (depressed button or the like) while making the contents of the operation display screen which is being drawn and the operation coordinates correspond to each other. The user interface unit 403 notifies the main control unit 402 of the operation contents, thereby receiving the operation of the operator.

A network communicating unit 404 communicates with other equipment on the network 104 by TCP/IP through the network I/F 306.

A data managing unit 405 stores various kinds of data such as work data and the like generated when the CPU 302 executes the controlling program into a predetermined area on the HDD 305 and manages. Those data is, for example, scan data generated by the flat original image photographing unit 411, book image photographing unit 412, and solid shape measuring unit 413.

(Description of Distance Image Sensor and Distance Image Obtaining Unit)

Figure 5A:
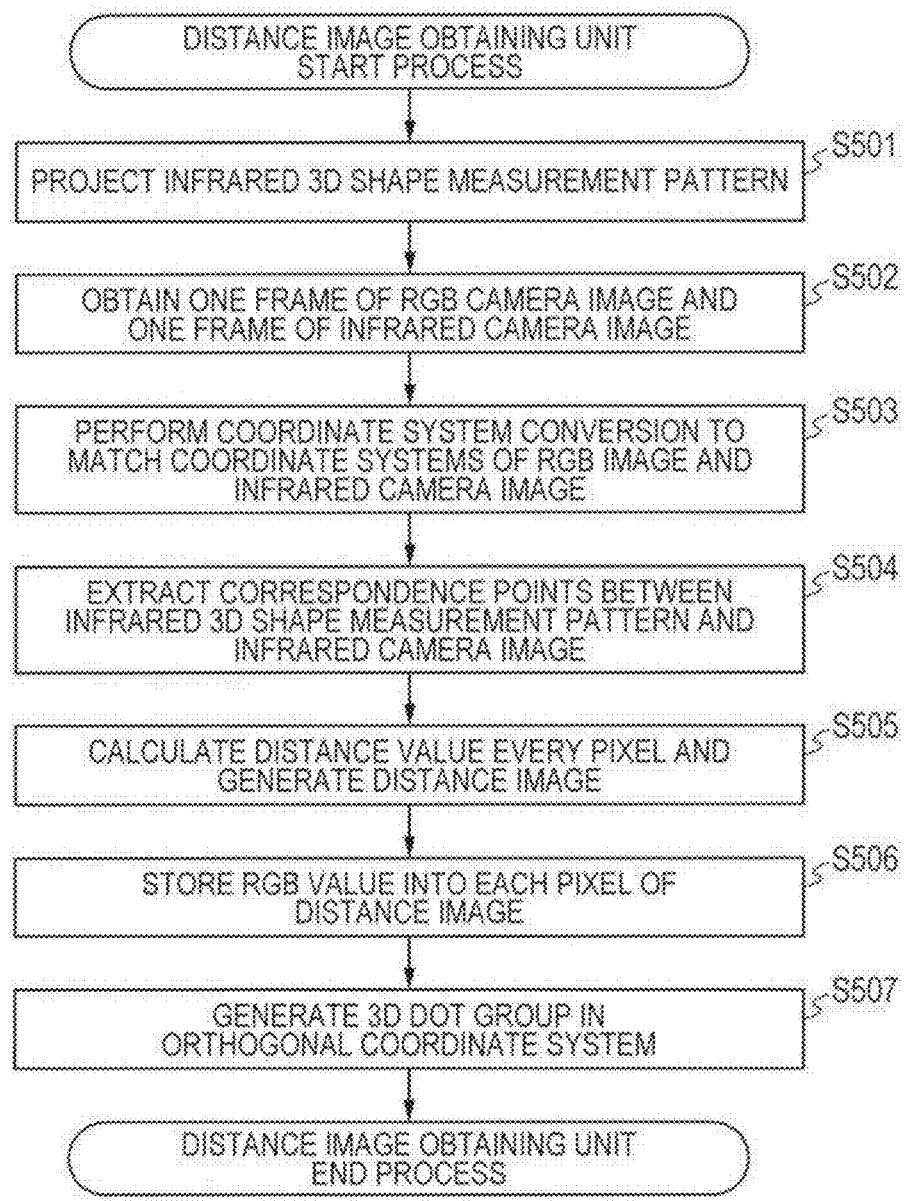
FIGS. 5A, 5B, 5C and 5D are a flowchart and the like illustrating an example of a process of a distance image obtaining unit of an embodiment 1.
Figure 5B:
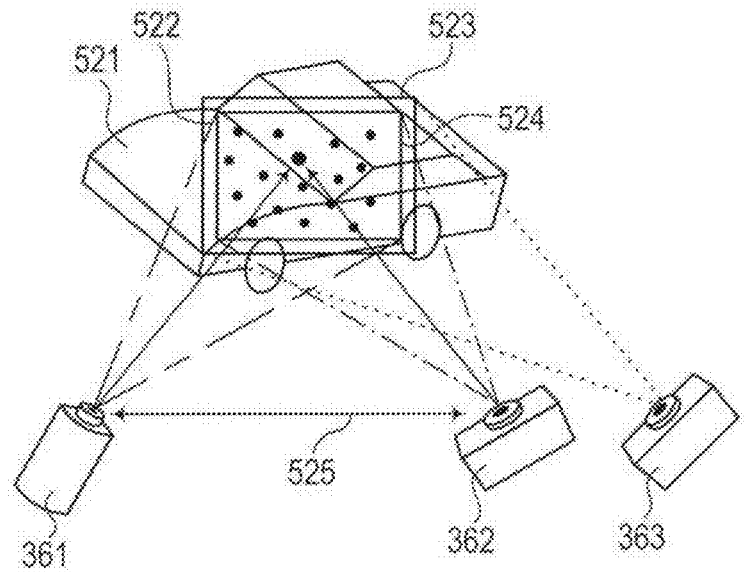
Figure 5C:
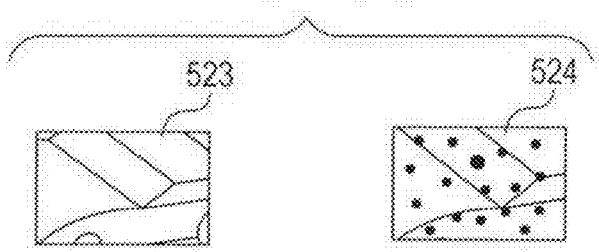
Figure 5D:
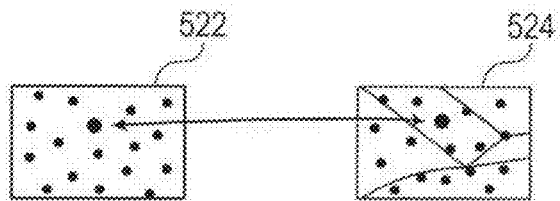

A construction of the distance image sensor unit 208 is illustrated in FIG. 3. The distance image sensor unit 208 is a distance image sensor of a pattern projection system by infrared rays. An infrared pattern projecting unit 361 projects a 3-dimensional measurement pattern to the target by infrared rays which are invisible to the human eyes. An infrared camera 362 is a camera for reading the 3-dimensional measurement pattern projected to the target. An RGB camera 363 is a camera for photographing visible light which is visible to the human eyes by an RGB signal. The process of the distance image obtaining unit 408 will be described by using a flowchart of FIG. 5A. FIGS. 5B to 5D are diagrams for describing a measuring principle of the distance image by the pattern projection system.

When the process is started, in S501, the distance image obtaining unit 408 projects a 3-dimensional measurement pattern (solid shape measurement pattern) 522 by infrared rays to a target 521 by using the infrared pattern projecting unit 361 as illustrated in FIG. 5B. In S502, the distance image obtaining unit 408 obtains an RGB camera image 523 obtained by photographing the target by using the RGB camera 363 and an infrared camera image 524 obtained by photographing the 3-dimensional measurement pattern 522 projected in S501 by using the infrared camera 362. In the infrared camera 362 and the RGB camera 363, since their disposing positions differ, photographing areas of the two RGB camera image 523 and infrared camera image 524 which are respectively photographed differ as illustrated in FIG. 5C.

In S503, the distance image obtaining unit 408 matches the coordinate system of the infrared camera image 524 with that of the RGB camera image 523 by using a coordinate system conversion from the coordinate system of the infrared camera 362 to the coordinate system of the RGB camera 363. It is now assumed that relative positions of the infrared camera 362 and the RGB camera 363 and their internal parameters have already been known by a previous calibrating process.

In S504, the distance image obtaining unit 408 extracts correspondence points between the 3-dimensional measurement pattern 522 and the infrared camera image 524 subjected to the coordinate conversion in S503 as illustrated in FIG. 5D. For example, the distance image obtaining unit 408 searches for one dot on the infrared camera image 524 from the 3-dimensional measurement pattern 522 and makes the correspondence when the same dot is detected. The distance image obtaining unit 408 may search for patterns around a pixel of the infrared camera image 524 from the 3-dimensional measurement pattern 522 and make it correspond to a portion having a largest similarity. In S505, the distance image obtaining unit 408 sets a straight line connecting the infrared pattern projecting unit 361 and the infrared camera 362 to a reference line 525 and performs a calculation by using a principle of triangular surveying, thereby calculating a distance from the infrared camera 362. With respect to the pixel which could be made to correspond in S504, the distance image obtaining unit 408 calculates a distance between the target 521 at the position corresponding to such a pixel and the infrared camera 362 and stores as a pixel value. On the other hand, with respect to a pixel which could be made to correspond, the distance image obtaining unit 408 stores an invalid value as a portion in which a distance could not be measured. The distance image obtaining unit 408 executes such processes to all pixels of the infrared camera image 524 subjected to the coordinate conversion in S503, thereby generating a distance image in which a distance value (distance information) is input to each pixel.

In S506, the distance image obtaining unit 408 stores the RGB values of the RGB camera image 523 into each pixel of the distance image, thereby generating a distance image having four values of R, G, B, and distance per pixel. As for the distance image obtained here, the distance image sensor coordinate system defined by the RGB camera 363 of the distance image sensor unit 208 is used as a reference.

Therefore, in S507, the distance image obtaining unit 408 converts the distance information obtained as a distance image sensor coordinate system into a 3-dimensional dot group in the orthogonal coordinate system as mentioned by using FIG. 2B. Hereinbelow, it is assumed that the 3-dimensional dot group denotes a 3-dimensional dot group in the orthogonal coordinate system unless otherwise specified.

Although the infrared pattern projection system is used as a distance image sensor unit 208 in the embodiment as mentioned above, a distance image sensor of another system can be also used. For example, a stereo system in which a stereo solid viewing is performed by the two RGB cameras or a TOF (Time of Flight) system in which a distance is measured by detecting a flying time of a laser beam may be used.

(Description of Gesture Recognizing Unit)

Figure 6:
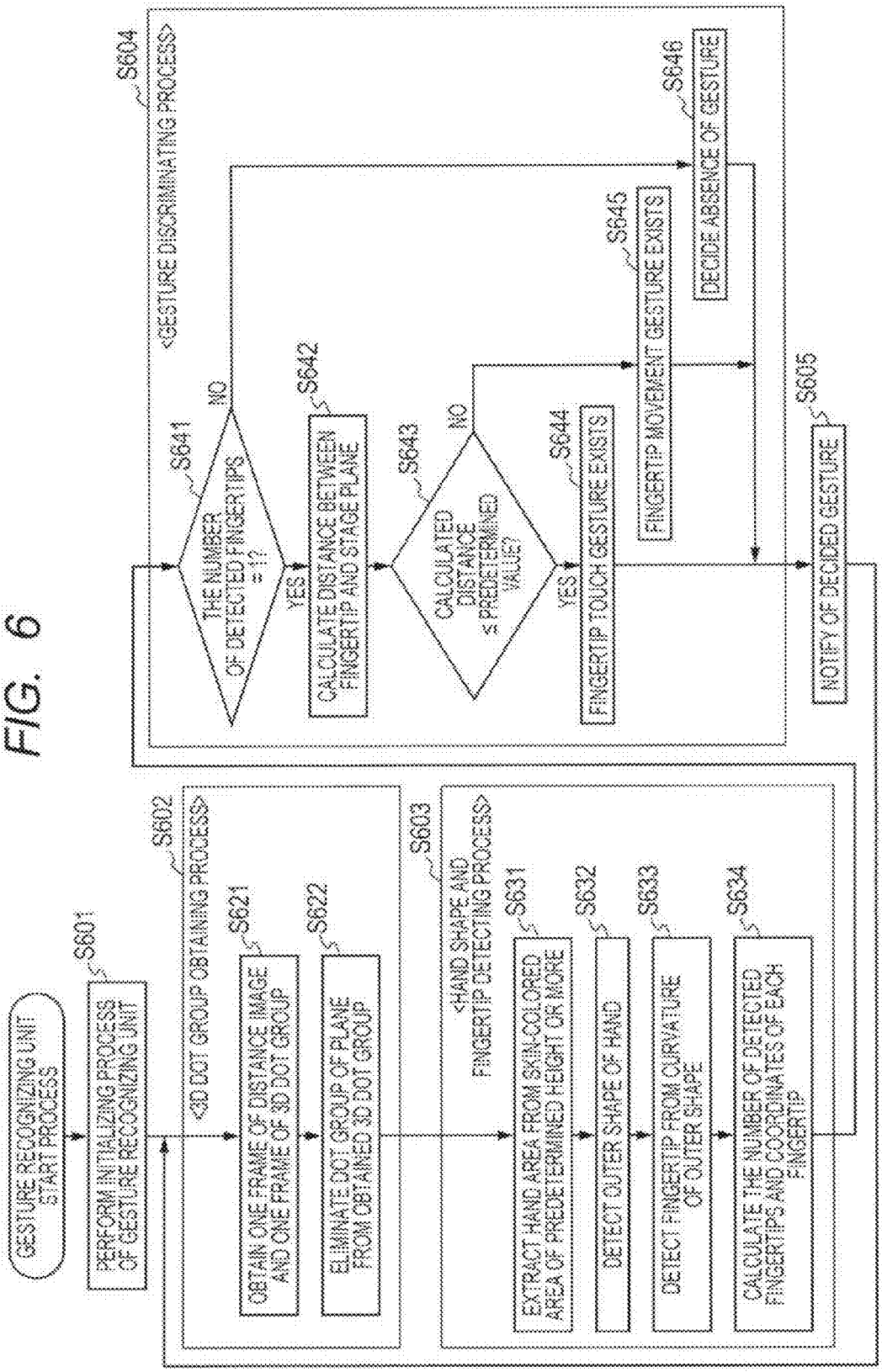
FIG. 6 is a flowchart illustrating an example of a process of a gesture recognizing unit of the embodiment 1.

Details of the process of the gesture recognizing unit 409 will be described by using a flowchart of FIG. 6. In FIG. 6, when the process is started, the gesture recognizing unit 409 executes an initializing process in S601. In the initializing process, the gesture recognizing unit 409 obtains one frame of the distance image from the distance image obtaining unit 408. When the process of the gesture recognizing unit 409 is started, since the apparatus is in a state where no target is put on the stage 204, a flat plane of the stage 204 is recognized as an initial state. That is, the gesture recognizing unit 409 extracts a widest plane from the obtained distance image, calculates its position and a normal vector (hereinbelow, referred to as plane parameters of the stage 204), and stores into the RAM 303.

In S602, the gesture recognizing unit 409 obtains a 3-dimensional dot group of the object existing on the stage 204 as shown in S621 to S622.

In S621, the gesture recognizing unit 409 obtains one frame of the distance image and one frame of the 3-dimensional dot group from the distance image obtaining unit 408.

In S622, the gesture recognizing unit 409 eliminates the dot group existing on the plane including the stage 204 from the obtained 3-dimensional dot group by using the plane parameters of the stage 204.

In S603, the gesture recognizing unit 409 executes a process for detecting a shape and a fingertip of the hand of the user from the obtained 3-dimensional dot group as shown in S631 to S634. The process of S603 will be described by using diagrams schematically illustrating a method of a fingertip detecting process shown in FIGS. 7A to 7C.

In S631, the gesture recognizing unit 409 extracts a skin-colored 3-dimensional dot group existing at a height which is equal to or larger than a predetermined height from the plane including the stage 204 from the 3-dimensional dot group obtained in S602, thereby obtaining a 3-dimensional dot group of the hand. Reference numeral 701 in FIG. 7A denotes an extracted 3-dimensional dot group of the hand.

Figure 7A:
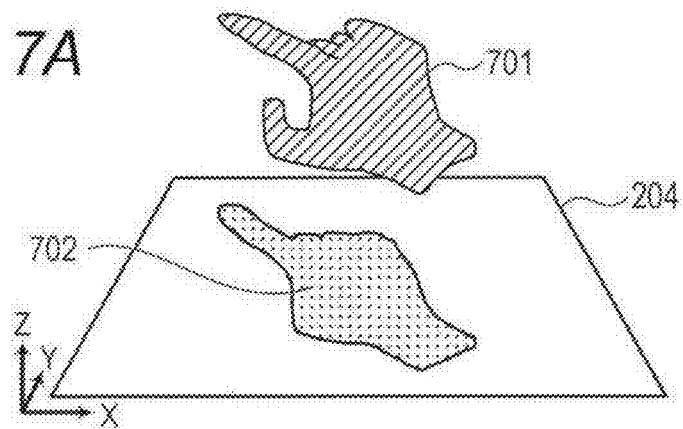
FIGS. 7A, 7B and 7C are schematic diagrams for describing a fingertip detecting process.
Figure 7B:
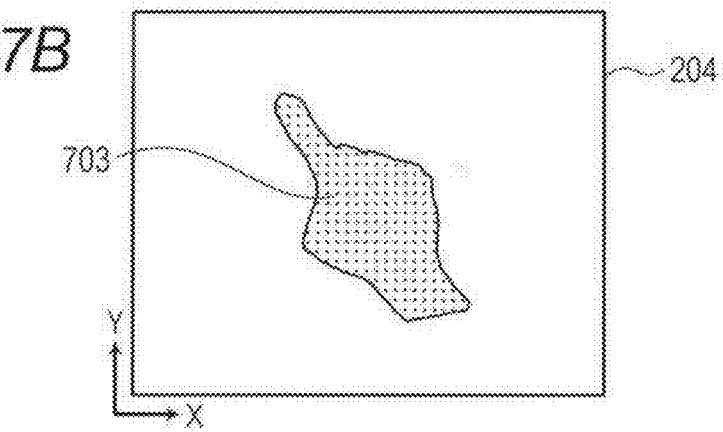

In S632, the gesture recognizing unit 409 generates a 2-dimensional image obtained by projecting the extracted 3-dimensional dot group of the hand to the plane of the stage 204, thereby detecting an outer shape of the hand. Reference numeral 702 in FIG. 7A denotes a 3-dimensional dot group projected to the plane of the stage 204. As for the projection, it is sufficient that the respective coordinate of the dot group are projected by using the plane parameters of the stage 204. If only the values of xy coordinates are extracted from the projected 3-dimensional dot group as illustrated in FIG. 7B, it can be handled as a 2-dimensional image 703 viewed from the z axis direction. At this time, it is assumed that the gesture recognizing unit 409 stores information showing to which one of the respective coordinates of the 2-dimensional image projected to the plane of the stage 204 each dot of the 3-dimensional dot group of the hand corresponds.

Figure 7C:
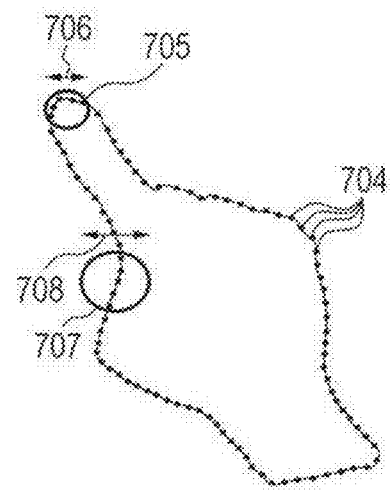

In S633, with respect to each dot on the detected outer shape of the hand, the gesture recognizing unit 409 calculates a curvature of the outer shape at such a dot and detects the dot, as a fingertip, in which the calculated curvature is smaller than a predetermined value. FIG. 7C schematically illustrates a method of detecting a fingertip from the curvature of the outer shape. Reference numeral 704 denotes a part of dots showing the outer shape of the 2-dimensional image 703 projected to the plane of the stage 204. A case of drawing circles so as to contain five adjacent dots among the dots showing the outer shape like 704 is now considered. Circles 705 and 707 are an example of such circles. Such circles are sequentially drawn to all dots of the outer shape and when their diameters (for example, 706, 708) are smaller than a predetermined value (the curvature is small), such a circle is assumed to be a fingertip. Although the number of adjacent dots is set to 5 in this example, such a number is not limited. Although the curvature is used here, the fingertip may be detected by performing an elliptic fitting to the outer shape.

In S634, the gesture recognizing unit 409 calculates the number of detected fingertips and the coordinates of each fingertip. At this time, as mentioned above, since a correspondence relation between each dot of the 2-dimensional image projected to the stage 204 and each dot of the 3-dimensional dot group of the hand has been stored, the gesture recognizing unit 409 can obtain the 3-dimensional coordinates of each fingertip. Although the method of detecting the fingertip from the image obtained by projecting from the 3-dimensional dot group to the 2-dimensional image has been described this time, the image serving as a target of the fingertip detection is not limited to such an image. For example, an area of the hand is extracted from a background difference of the distance image or a skin-colored area of the RGB image and a fingertip in the hand area may be detected by a method (calculation of a curvature of an outer shape, or the like) similar to that mentioned above. In this case, since the coordinates of the detected fingertip are the coordinates on the 2-dimensional image such as an RGB image or distance image, it is necessary that the gesture recognizing unit 409 converts into the 3-dimensional coordinates of the orthogonal coordinate system by using the distance information of the distance image at such coordinates. At this time, a center of the curvature circle used when detecting the fingertip instead of the dots on the outer shape serving as a fingertip point may be used as a fingertip point.

In S604, the gesture recognizing unit 409 executes a gesture discriminating process from the detected shape and fingertip of the hand as shown in S641 to S646. In S641, the gesture recognizing unit 409 discriminates whether or not the number of fingertips detected in S603 is equal to 1. If it is not equal to 1, the gesture recognizing unit 409 advances to S646 and decides the absence of the gesture. If the number of detected fingertips is equal to 1 in S641, the gesture recognizing unit 409 advances to S642 and calculates a distance between the detected fingertip and the plane including the stage 204.

In S643, the gesture recognizing unit 409 discriminates whether or not the distance calculated in S642 is equal to or less than a predetermined value. If it is equal to or less than the predetermined value, the gesture recognizing unit 409 advances to S644 and decides that the touch gesture in which the stage 204 was touched with the fingertip exists. If the distance calculated in S642 is larger than the predetermined value in S643, the gesture recognizing unit 409 advances to S645 and decides that the gesture in which the fingertip was moved (gesture in which the fingertip exists on the stage 204 although it does not touch) exists.

In S605, the gesture recognizing unit 409 notifies the main control unit 402 of the decided gesture, is returned to S602, and repeats the gesture recognizing process.

By the above processes, the gesture recognizing unit 409 can recognize the gesture of the user on the basis of the distance image.

(Process of Object Detecting Unit)

Figure 8A:
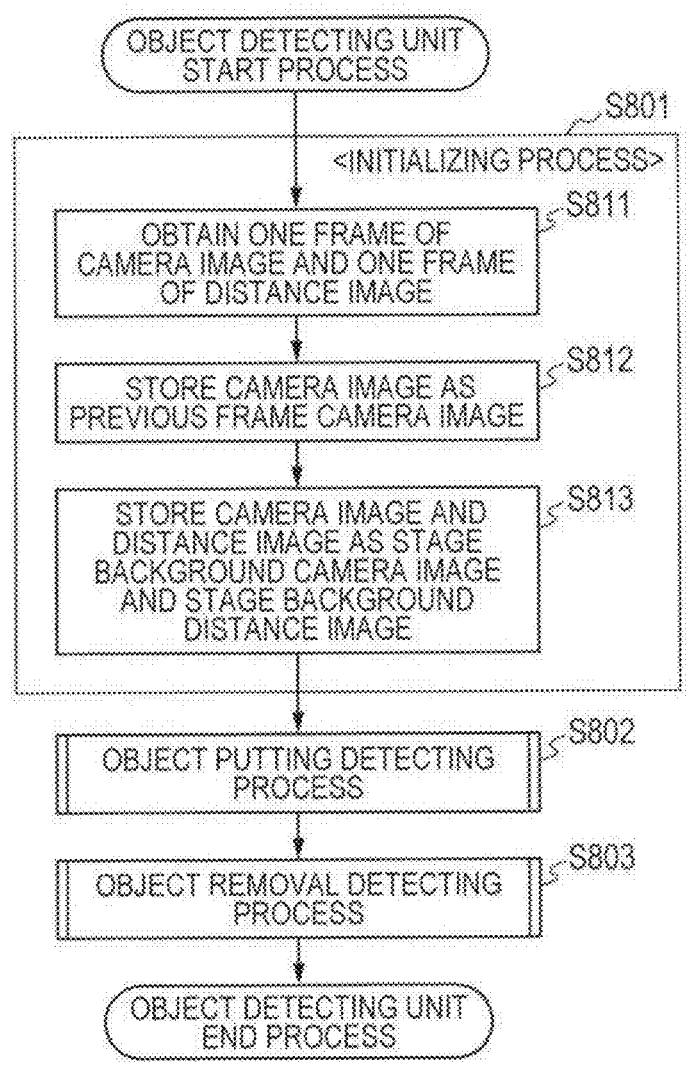
FIGS. 8A, 8B and 8C are flowcharts illustrating an example of a process of an object detecting unit of the embodiment 1.

The process of the object detecting unit 410 will be described by using flowcharts of FIGS. 8A to 8C. When the process is started, in S801 in FIG. 8A, the object detecting unit 410 executes an initializing process shown in S811 to S813. In S811, the object detecting unit 410 obtains one frame of the camera image from the camera image obtaining unit 407 and one frame of the distance image from the distance image obtaining unit 408, respectively. In S812, the object detecting unit 410 stores the obtained camera image as a previous frame camera image. In S813, the object detecting unit 410 stores the obtained camera image and distance image as a stage background camera image and a stage background distance image, respectively. Hereinbelow, "stage background camera image" and "stage background distance image" denote the camera image and distance image obtained here.

In S802, the object detecting unit 410 detects that an object has been put on the stage 204 (object putting detecting process). Details of the process will be described hereinafter by using FIG. 8B.

In S803, the object detecting unit 410 detects that the object on the stage 204 in which the putting was detected in S802 has been removed (object removal detecting process). Details of the process will be described hereinafter by using FIG. 8C.

Figure 8B:
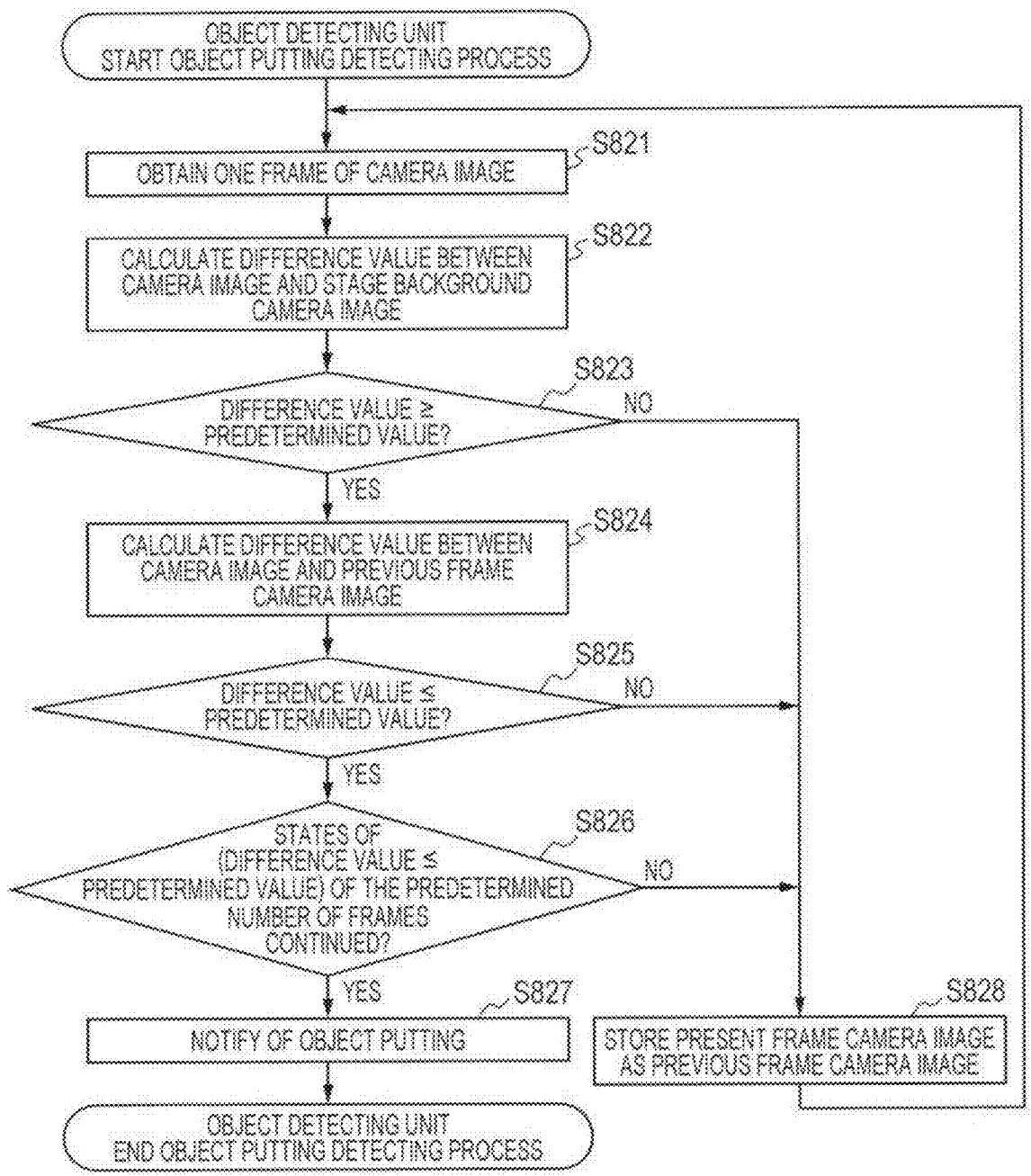

FIG. 8B shows the details of the object putting detecting process of S802.

When the object putting detecting process is started, the object detecting unit 410 obtains one frame of the camera image from the camera image obtaining unit 407 in S821.

In S822, the object detecting unit 410 calculates a difference between the obtained camera image and the previous frame camera image and calculates a difference value in which their absolute values are added.

In S823, the object detecting unit 410 discriminates whether or not the calculated difference value is equal to or larger than a predetermined value (is equal to or larger than a threshold value). If the calculated difference value is smaller than the predetermined value (is smaller than the threshold value), the object detecting unit 410 decides that no object exists on the stage 204. The object detecting unit 410 advances to S828, stores the camera image of the present frame as a previous frame camera image, is returned to S821, and continues the process. If the difference value is equal to or larger than the predetermined value in S823, the object detecting unit 410 advances to S824 and calculates a difference value between the camera image obtained in S821 and the previous frame camera image in a manner similar to S822.

In S825, the object detecting unit 410 discriminates whether or not the calculated difference value is equal to or smaller than a predetermined value. If the calculated difference value is larger than the predetermined value in S825, the object detecting unit 410 decides that the object on the stage 204 was moved. The object detecting unit 410 advances to S828, stores the camera image of the present frame as a previous frame camera image, is returned to S821, and continues the process. If the calculated difference value is equal to or smaller than the predetermined value in S825, the object detecting unit 410 advances to S826. In S826, from the number of times of a state where a discrimination result of S825 is continuously YES, the object detecting unit 410 discriminates whether or not the difference value is equal to or smaller than the predetermined value, that is, whether or not a state where the object on the stage 204 rests has continued the number of times as many as the predetermined number of frames. If it is determined in S826 that the state where the object on the stage 204 rests does not continue the number of times as many as the predetermined number of frames, the object detecting unit 410 advances to S828, stores the camera image of the present frame as a previous frame camera image, is returned to S821, and continues the process. If it is determined in S826 that the state where the object on the stage 204 rests has continued the number of times as many as the predetermined number of frames, the object detecting unit 410 advances to S827, notifies the main control unit 402 that the object has been put, and ends the object putting detecting process.

Figure 8C:
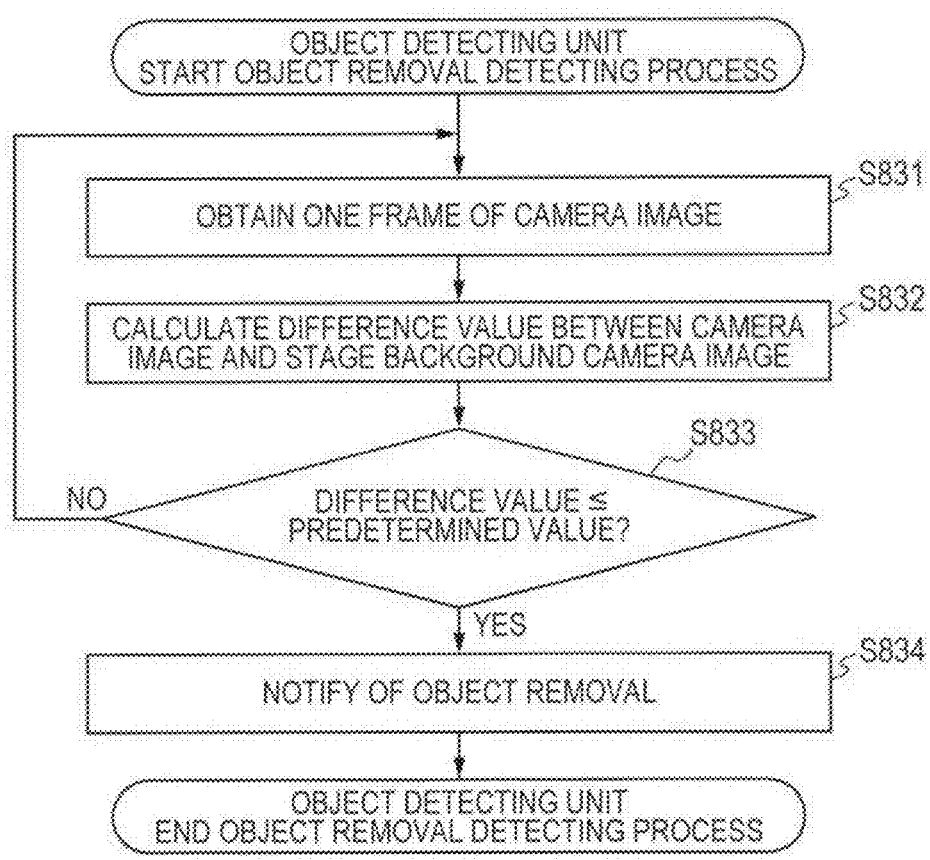

FIG. 8C shows the details of the object removal detecting process of S803.

When the object removal detecting process is started, the object detecting unit 410 obtains one frame of the camera image from the camera image obtaining unit 407 in S831.

In S832, the object detecting unit 410 calculates a difference value between the obtained camera image and the stage background camera image.

In S833, the object detecting unit 410 discriminates whether or not the calculated difference value is equal to or smaller than a predetermined value. If the calculated difference value is larger than the predetermined value in S833, since the object still remains on the stage 204, the object detecting unit 410 is returned to S831 and continues the process. If the calculated difference value is equal to or smaller than the predetermined value in S833, since no object exists on the stage 204, the object detecting unit 410 notifies the main control unit 402 that the object was removed, and ends the object removal detecting process. By the above processes, the object detecting unit 410 can detect the putting and removal of the object on the stage 204 on the basis of the camera image. In addition, when the object is a flat object such as paper or the like, the object detecting unit 410 cannot detect the putting and removal of the object on the stage 204 only from the distance image. However, as mentioned above, by using the camera image, they can be detected.

(Description of Flat Original Image Photographing Unit)

Figure 9:
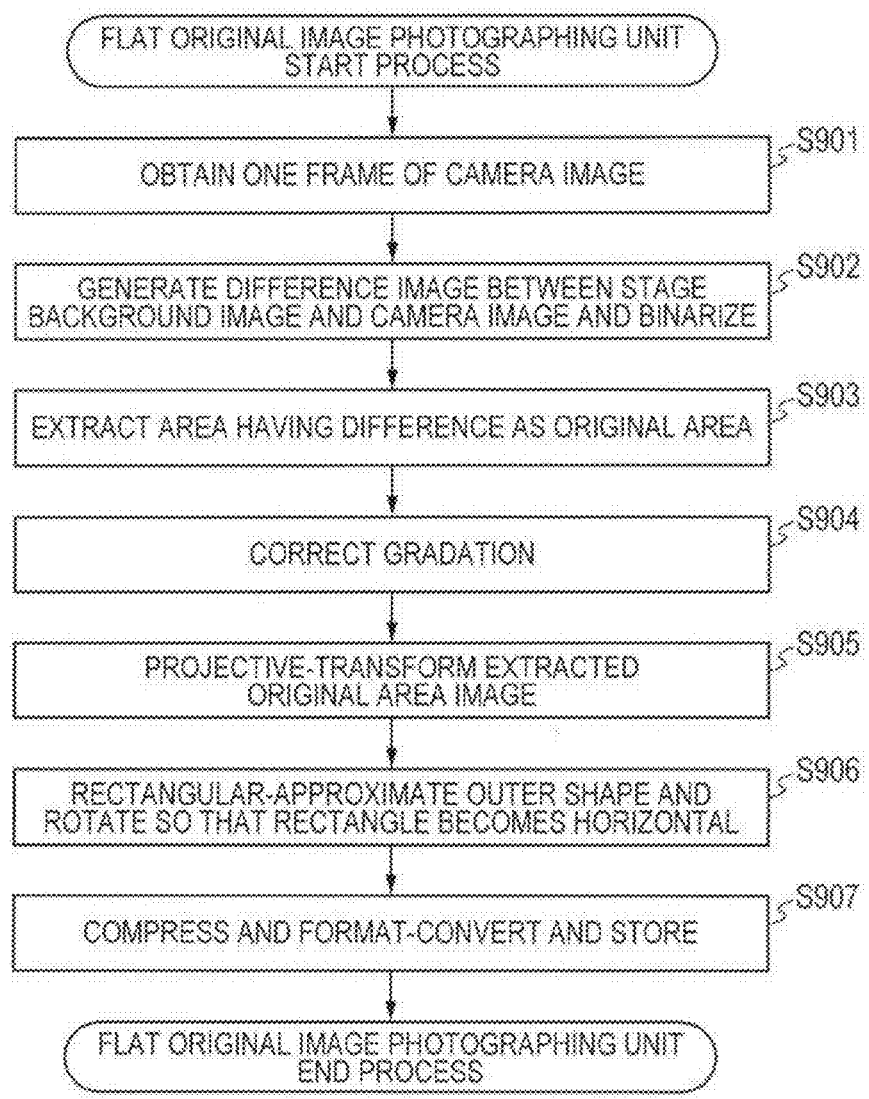
FIG. 9 is a flowchart illustrating an example of a process of a flat original image photographing unit.

The process which is executed by the flat original image photographing unit 411 will be described by using a flowchart of FIG. 9. FIGS. 10A to 10H are schematic diagrams for describing the process of the flat original image photographing unit 411.

Figure 10A:
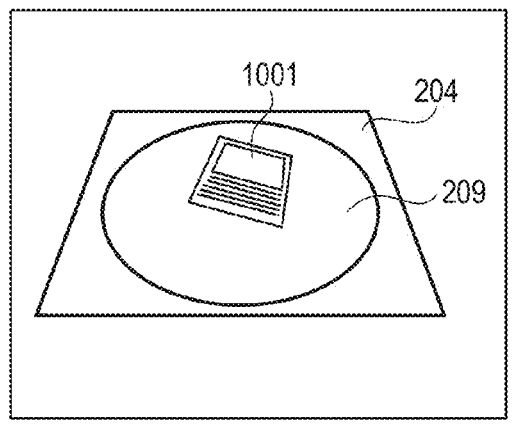
FIGS. 10A, 10B, 10C, 10D, 10E, 10F, 10G and 10H are schematic diagrams for describing a process of the flat original image photographing unit.
Figure 10B:
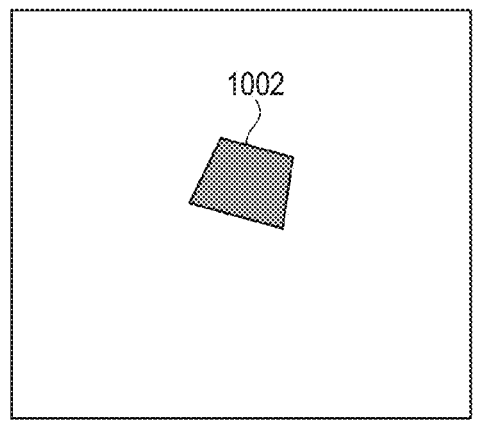

When the process is started, in S901, the flat original image photographing unit 411 obtains one frame of the image from the camera unit 202 through the camera image obtaining unit 407. Since the coordinate system of the camera unit 202 does not accurately face the stage 204 as illustrated in FIG. 2B, the photographed image at this time is distorted together with a target 1001 and the stage 204 as illustrated in FIG. 10A.

Figure 10C:
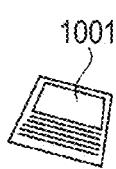

In S902, the flat original image photographing unit 411 calculates a difference between the stage background camera image and the camera image obtained in S901, generates a difference image, and subsequently, binarizes in such a manner that the pixel having a difference is displayed in black and the pixel having no difference is displayed in white. Therefore, the difference image generated by the flat original image photographing unit 411 becomes an image (having a difference) in which an area of the target 1001 is displayed in black as shown in an area 1002 in FIG. 10B. In S903, the flat original image photographing unit 411 extracts the image of only the target 1001 as illustrated in FIG. 10C by using the area 1002. In S904, the flat original image photographing unit 411 performs a gradation correction to the extracted original area image.

Figure 10D:
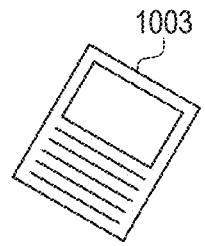

In S905, the flat original image photographing unit 411 projective-transforms the extracted original area image from the camera coordinate system to the stage 204, thereby converting into an image 1003 viewed from directly above the stage 204 as illustrated in FIG. 10D. In the process of the gesture recognizing unit 409, a projective-transform parameter used here can be obtained from the plane parameters calculated in S601 in FIG. 6 mentioned above and the camera coordinate system. As illustrated in FIG. 10D, there is a case where the image 1003 obtained here is inclined in dependence on a way of putting of the original onto the stage 204.

Figure 10E:
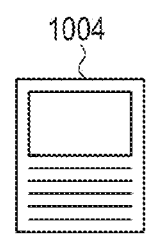
Figure 10F:
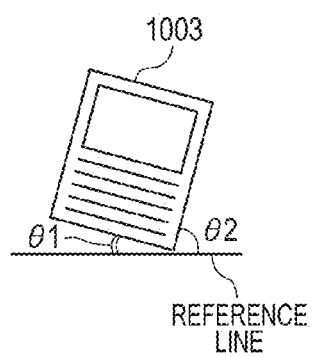
Figure 10G:
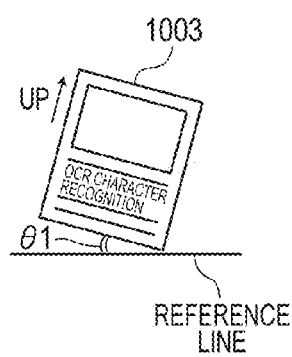
Figure 10H:
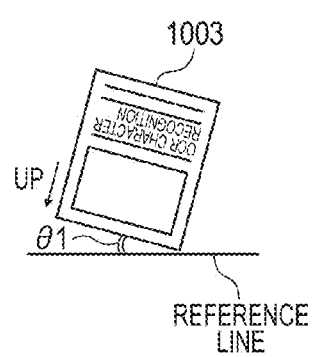

Therefore, in S906, the flat original image photographing unit 411 rectangular-approximates the image 1003, subsequently rotates so that its rectangle becomes horizontal, and obtains a non-inclined image like an image 1004 illustrated in FIG. 10E. As illustrated in FIG. 10F, the flat original image photographing unit 411 calculates inclinations θ1 and θ2 of the rectangle to a reference line and decides the smaller inclination (θ1 here) as an angle of rotation of the image 1003. As illustrated in FIGS. 10G and 10H, the flat original image photographing unit 411 may execute an OCR process to a character train included in the image 1003, calculate the rotation angle of the image 1003 from an inclination of the character train, and execute a top and bottom discriminating process. In S907, the flat original image photographing unit 411 performs a compression and a file format conversion to the extracted image 1004 in accordance with a predetermined image format (for example, JPEG, TIFF, PDF, or the like). The flat original image photographing unit 411 stores the resultant image as a file into a predetermined area in the HDD 305 through the data managing unit 405 and ends the process.

(Process of Book Image Photographing Unit)

The process which is executed by the book image photographing unit 412 will be described by using flowcharts of FIGS. 11A and 11B. FIGS. 12A to 12H are schematic diagrams for describing the process of the book image photographing unit 412.

Figure 11A:
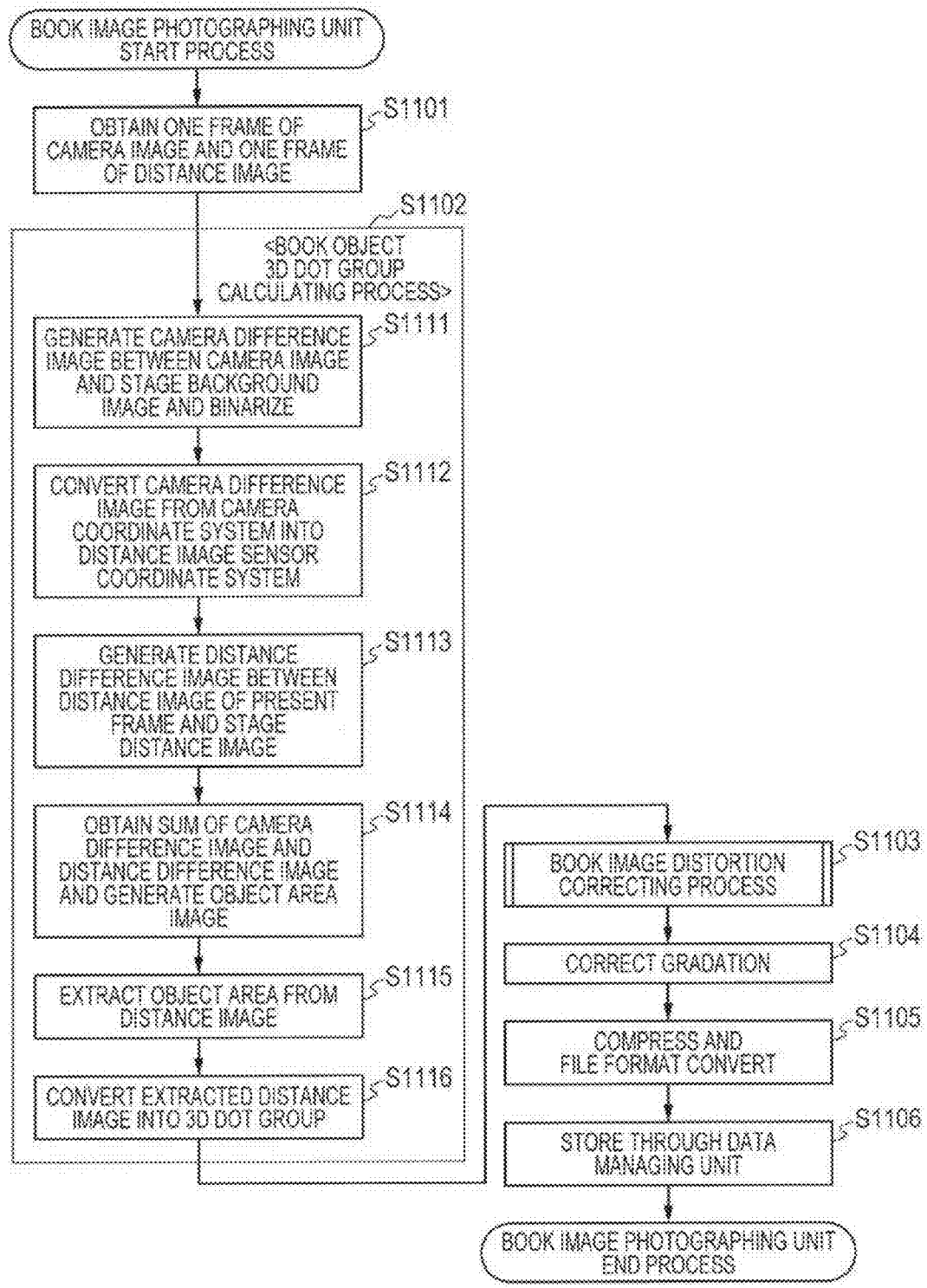
FIGS. 11A and 11B are flowcharts illustrating an example of a process of a book image photographing unit.
Figure 11B:
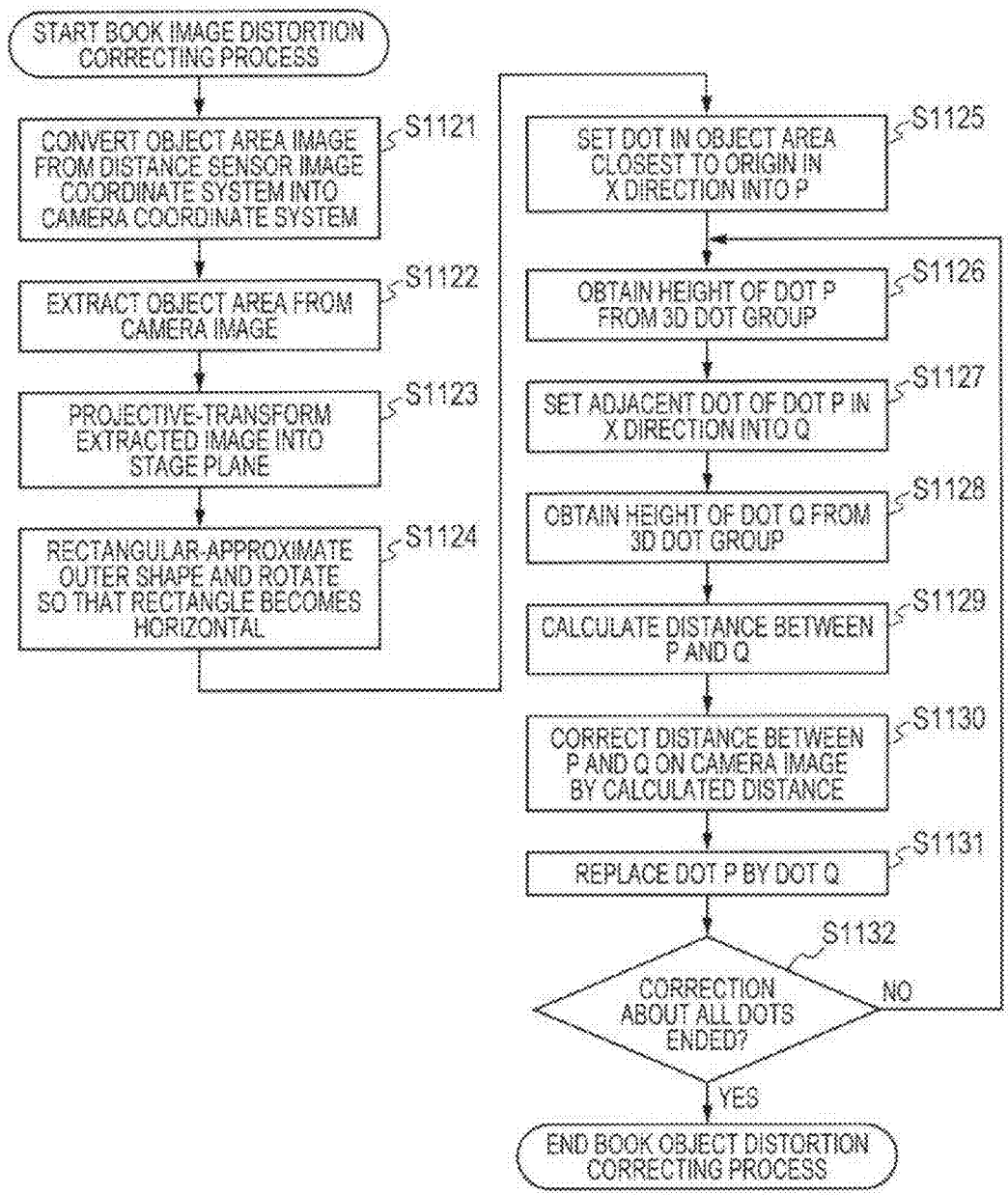
Figure 12A:
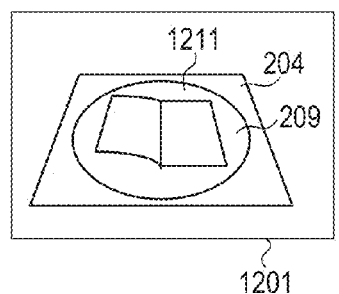
FIGS. 12A, 12B, 12C, 12D, 12E, 12F, 12G and 12H are schematic diagrams for describing a process of the book image photographing unit.
Figure 12B:
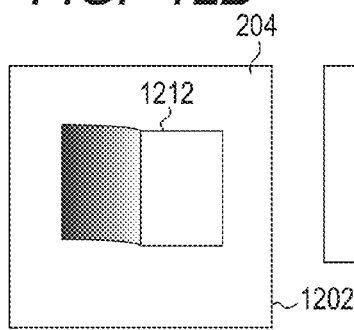

In FIG. 11A, when the process is started, in S1101, the book image photographing unit 412 obtains one frame of the camera image from the camera unit 202 by using the camera image obtaining unit 407 and one frame of the distance image from the distance image sensor unit 208 by using the distance image obtaining unit 408 at a time, respectively. An example of the camera image obtained here is illustrated in FIG. 12A. In FIG. 12A, a camera image 1201 including the stage 204 and a photographing target book serving as a target object 1211 is obtained. FIG. 12B illustrates an example of the obtained distance image. In FIG. 12B, a portion which is closer to the distance image sensor unit 208 is displayed in a deep color. In each pixel on a target object 1212, a distance image 1202 containing the distance information from the distance image sensor unit 208 is obtained. In FIG. 12B, the pixel in which a distance from the distance image sensor unit 208 is larger than that from the stage 204 is displayed in white. A portion (in the target object 1212, a page on the right side) of the target object 1212 which is in contact with the stage 204 is also similarly displayed in white.

In S1102, the book image photographing unit 412 executes a process for calculating a 3-dimensional dot group of a book object put on the stage 204 from the obtained camera image and the distance image as shown in S1111 to S1116.

Figure 12C:
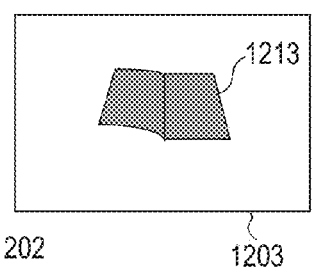

In S1111, the book image photographing unit 412 calculates a difference between the camera image and the stage background camera image every pixel, binarizes, and generates a camera difference image 1203 in which a book area 1213 is displayed in black as illustrated in FIG. 12C.

Figure 12D:
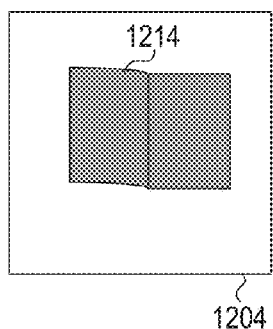

In S1112, the book image photographing unit 412 converts the camera difference image 1203 from the camera coordinate system to the distance image sensor coordinate system and generates a camera difference image 1204 containing an object area 1214 viewed from the distance image sensor unit 208 as illustrated in FIG. 12D.

Figure 12E:
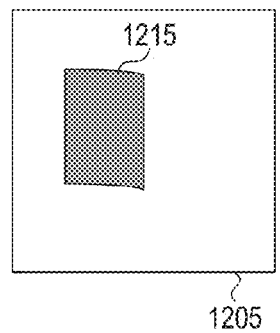

In S1113, the book image photographing unit 412 calculates a difference between the distance image and the stage background distance image every pixel, binarizes, and generates a distance difference image 1205 in which an object area 1215 is displayed in black as illustrated in FIG. 12E. With respect to a portion of the target object 1211 of the same color as that of the stage 204, since a difference between the pixel values is small, there is a case where such a portion is not included in the book area 1213 in the camera difference image 1203. With respect to a portion of the target object 1212 having a height similar to that of the stage 204, since a difference between the distance value from the distance image sensor unit 208 and the distance value to the stage 204 is small, there is a case where such a portion is not included in the object area 1215 in the distance difference image 1205.

Figure 12F:
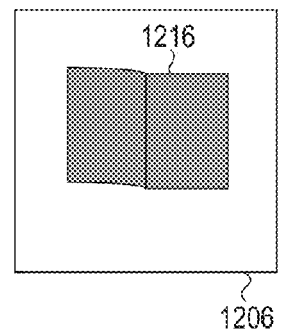

Therefore, in S1114, the book image photographing unit 412 obtains a sum of the camera difference image 1203 and the distance difference image 1205, generates an object area image 1206 illustrated in FIG. 12F, and obtains an object area 1216. The object area 1216 is an area whose color or height differs from that of the stage 204 and shows an object area more accurately than that in the case of using only one of the object area 1213 in the camera difference image 1203 and the object area 1215 in the distance difference image 1205. Since the object area image 1206 is an image of the distance image sensor coordinate system, in S1115, the book image photographing unit 412 can extract only the object area 1216 in the object area image 1206 from the distance image 1202.

Figure 12G:
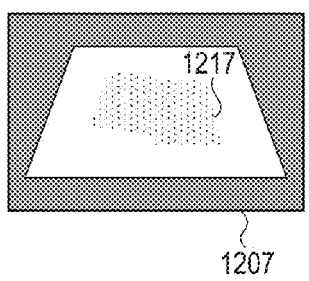

In S1116, the book image photographing unit 412 converts the distance image extracted in S1115 into the orthogonal coordinate system, thereby generating a 3-dimensional dot group 1217 illustrated in FIG. 12G. This 3-dimensional dot group 1217 is a 3-dimensional dot group of the book object.

In S1103, the book image photographing unit 412 executes a book image distortion correcting process from the obtained camera image and the calculated 3-dimensional dot group, thereby generating a 2-dimensional book image. The process of S1103 will be described in detail in FIG. 11B.

The book image distortion correcting process of S1103 will be described by using a flowchart of FIG. 11B. When the book image distortion correcting process is started, in S1121, the book image photographing unit 412 converts the object area image 1206 from the distance image sensor coordinate system to the camera coordinate system.

In S1122, the book image photographing unit 412 extracts an object area from the camera image 1201 by using the image obtained by converting the object area 1216 in the object area image 1206 into the camera coordinate system.

In S1123, the book image photographing unit 412 projective-transforms the extracted object area image into the stage plane.

Figure 12H:
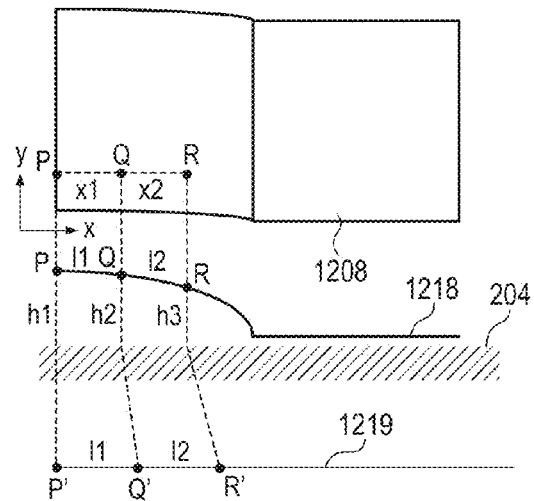

In S1124, the book image photographing unit 412 rectangular-approximates the projective-transformed object area image and rotates so that its rectangle becomes horizontal, thereby generating a book image 1208 in FIG. 12H. As for the book image 1208, since one side of the approximation rectangle is parallel with the X axis, the book image photographing unit 412 subsequently executes a distortion correcting process in the X axis direction to the book image 1208.

In S1125, the book image photographing unit 412 sets the leftmost dot of the book image 1208 to P (dot P in FIG. 12H).

In S1126, the book image photographing unit 412 obtains a height ($h_1$ in FIG. 12H) of the dot P from a 3-dimensional dot group 1217 of the book object.

In S1127, the book image photographing unit 412 sets a dot away from the dot P of the book image 1208 by a predetermined distance ($x_1$ in FIG. 12H) in the X axis direction to Q (dot Q in FIG. 12H).

In S1128, the book image photographing unit 412 obtains a height ($h_2$ in FIG. 12H) of the dot Q from the 3-dimensional dot group 1217.

In S1129, the book image photographing unit 412 calculates a distance ($l_1$ in FIG. 12H) between the dots P and Q on the book object by a linear approximation by the following equation (4).

$$l1 = \sqrt{x1^2 + (h1-h2)^2} \quad (4)$$

In S1130, the book image photographing unit 412 corrects a distance between P and Q by the calculated distance $l_1$ and copies the pixel to positions of dots P' and Q' on an image 1219 in FIG. 12H.

In S1131, the book image photographing unit 412 sets the processed dot Q to the dot P, is returned to S1128, and executes the same process, so that the correction between the dot Q and a dot R in FIG. 12H can be executed, thereby setting to the pixels at the dot Q' and a dot R' on the image 1219. The book image photographing unit 412 repeats the above process with respect to all pixels, so that the image 1219 becomes an image after the distortion correction.

In S1132, the book image photographing unit 412 discriminates whether or not the distortion correcting process has been ended with respect to all dots. If it has been finished, the distortion correcting process of the book object is ended. As mentioned above, by executing the processes of S1102 and S1103, the book image photographing unit 412 can generate the book image subjected to the distortion correction.

After the book image subjected to the distortion correction was generated, in S1104, the book image photographing unit 412 performs a gradation correction to the generated book image.

In S1105, the book image photographing unit 412 performs a compression and a file format conversion to the generated book image in accordance with a predetermined image format (for example, JPEG, TIFF, PDF, or the like).

In S1106, the book image photographing unit 412 stores the generated image data as a file into a predetermined area in the HDD 305 through the data managing unit 405 and ends the process.

(Description of Solid Shape Measuring Unit)

Figure 13A:
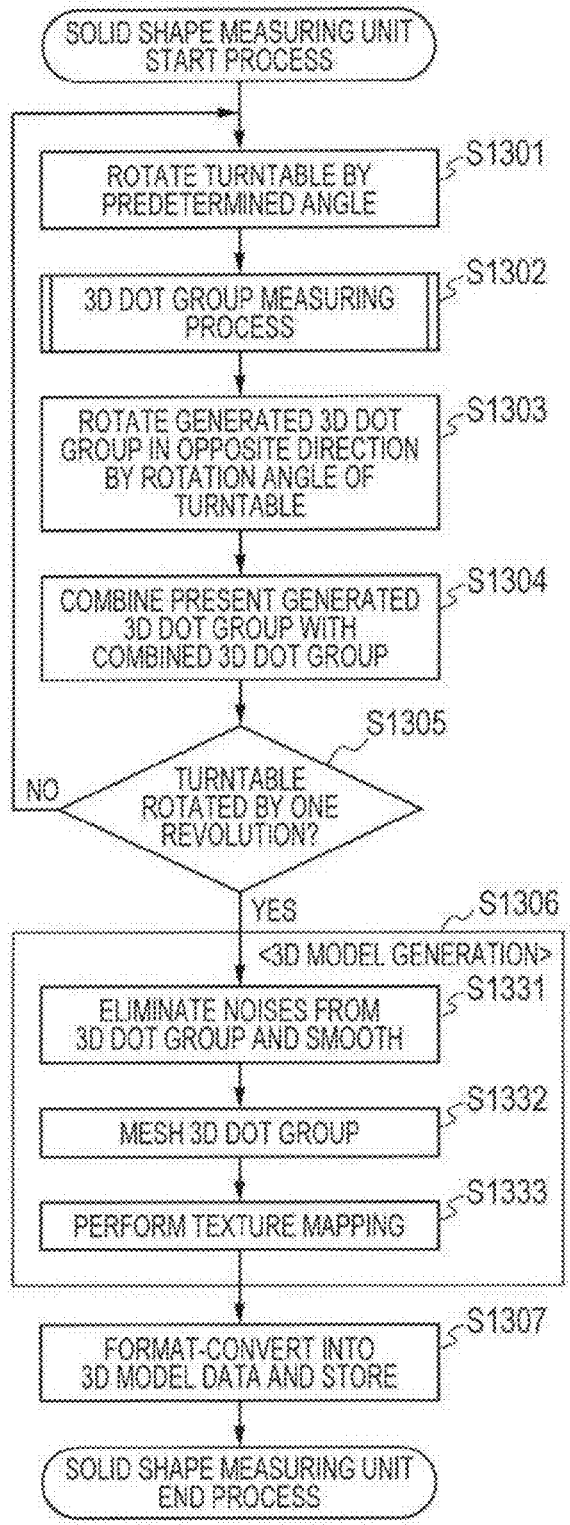
FIGS. 13A and 13B are flowcharts illustrating an example of a process of a solid shape measuring unit of the embodiment 1.
Figure 13B:
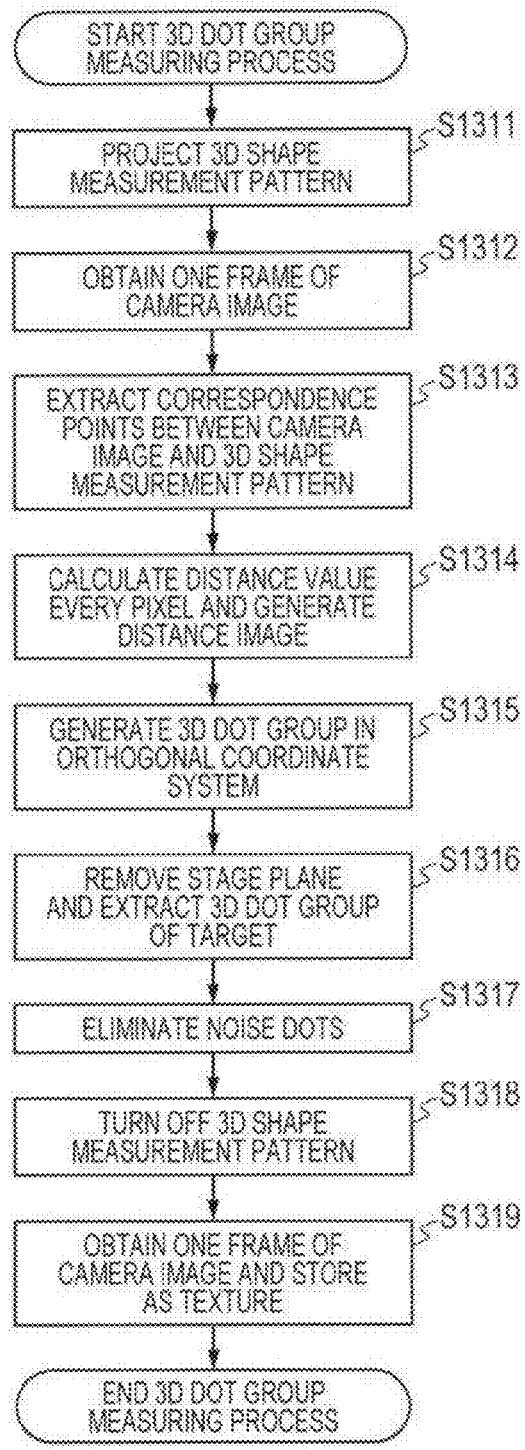

The process which is executed by the solid shape measuring unit 413 will be described by using flowcharts of FIGS. 13A and 13B. FIGS. 14A to 14F are schematic diagrams for describing the process of the solid shape measuring unit 413.

When the process is started, in S1301, the solid shape measuring unit 413 instructs a rotation to the turntable 209 through the serial I/F 310, thereby rotating the turntable 209 by a predetermined angle at a time. The smaller a rotation angle here is, the higher a final measuring accuracy is. However, the number of measurement times increases and it takes a time in accordance with the high accuracy. Therefore, it is sufficient to predetermine a proper rotation angle as an apparatus.

In S1302, the solid shape measuring unit 413 executes a 3-dimensional dot group measuring process to the object on the turntable 209 provided in the stage 204 by using the camera unit 202 and the projector 207. A flowchart of FIG. 13B is a flowchart for the 3-dimensional dot group measuring process which is executed by the solid shape measuring unit 413 in S1302.

Figure 14A:
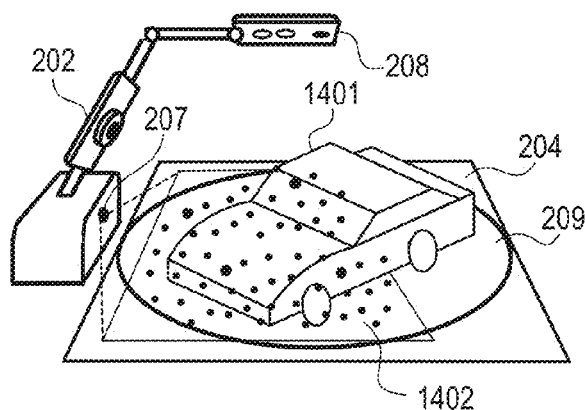
FIGS. 14A, 14B, 14C, 14D, 14E and 14F are schematic diagrams for describing a process of the solid shape measuring unit.
Figure 14B:
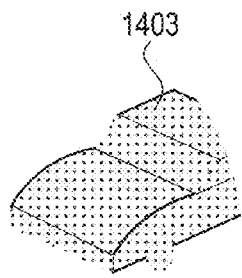

When the 3-dimensional dot group measuring process is started, in S1311, the solid shape measuring unit 413 projects a 3-dimensional shape measurement pattern 1402 from the projector 207 to a target 1401 on the turntable 209 illustrated in FIG. 14A.

In S1312, the solid shape measuring unit 413 obtains one frame of the camera image from the camera unit 202 through the camera image obtaining unit 407.

In S1313, the solid shape measuring unit 413 extracts a correspondence point between the 3-dimensional shape measurement pattern 1402 and the obtained camera image in a manner similar to S504 in FIGS. 5A to 5D.

In S1314, the solid shape measuring unit 413 calculates a distance in each pixel on the camera image from a positional relation between the camera unit 202 and the projector 207 and generates a distance image. A measuring method here is the same as the measuring method described in S505 in FIGS. 5A to 5D in the process of the distance image obtaining unit 408. In S1315, the solid shape measuring unit 413 performs a coordinate conversion into the orthogonal coordinate system with respect to each pixel of the distance image and calculates a 3-dimensional dot group.

In S1316, the solid shape measuring unit 413 eliminates the 3-dimensional dot group included in the stage plane from the calculated 3-dimensional dot groups by using the plane parameters of the stage 204.

In S1317, from the remaining 3-dimensional dot groups, the solid shape measuring unit 413 eliminates the dots, as noises, whose positions are largely deviated and generates a 3-dimensional dot group 1403 of the target 1401. The dot whose position is largely deviated is, for example, a dot which is deviated from a predetermined position.

In S1318, the solid shape measuring unit 413 turns off the 3-dimensional shape measurement pattern 1402 projected from the projector 207.

In S1319, the solid shape measuring unit 413 obtains the camera image from the camera unit 202 through the camera image obtaining unit 407, stores as a texture image when viewed from its angle, and ends the 3-dimensional dot group measuring process.

Figure 14C:
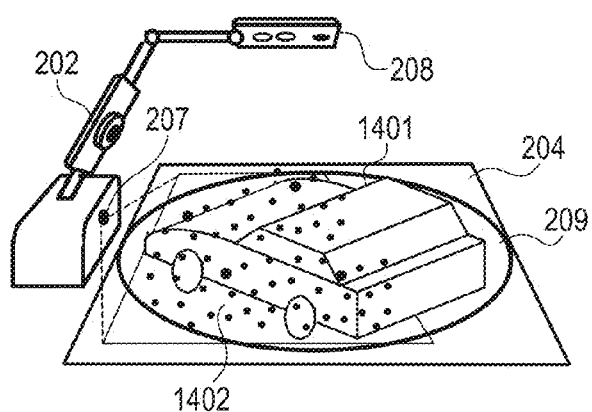
Figure 14D:
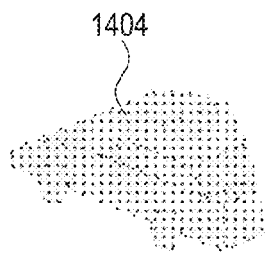
Figure 14E:
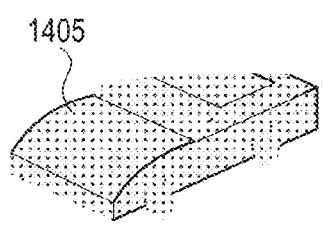
Figure 14F:
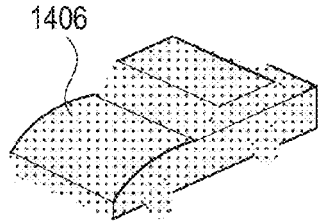

When the solid shape measuring unit 413 executes the 3-dimensional dot group measuring process of S1302 at the second and subsequent times, in S1301, the turntable 209 was rotated and the measurement was performed. Therefore, as illustrated in FIG. 14C, angles of the target 1401 on the turntable 209, the projector 207, and the camera unit 202 have been changed. Thus, as illustrated in FIG. 14D, the solid shape measuring unit 413 obtains a 3-dimensional dot group 1404 viewed from a viewpoint different from the 3-dimensional dot group 1403 obtained in S1302. That is, in the 3-dimensional dot group 1403, the 3-dimensional dot group of the portion which could not be calculated because it became a blind spot from the camera unit 202 and the projector 207 is included in the 3-dimensional dot group 1404. On the contrary, the 3-dimensional dot group which is not included in the 3-dimensional dot group 1404 is included in the 3-dimensional dot group 1403. Therefore, the solid shape measuring unit 413 executes a process for overlaying the two 3-dimensional dot groups 1403 and 1404 viewed from the different viewpoints.

In S1303, the solid shape measuring unit 413 rotates the 3-dimensional dot group 1404 measured in S1302 in the opposite direction by the rotation angle of the turntable from the initial position, thereby calculating a 3-dimensional dot group 1405 whose position is matched with that of the 3-dimensional dot group 1403.

In S1304, the solid shape measuring unit 413 executes a process for combining the 3-dimensional dot group calculated in S1303 and the 3-dimensional dot group which has already been combined. In the combining process of the 3-dimensional dot groups, an ICP (Iterative Closest Point) algorithm using feature points is used. In the ICP algorithm, the solid shape measuring unit 413 extracts 3-dimensional feature points each serving as a corner from the two 3-dimensional dot groups 1403 and 1404 as targets to be combined. The solid shape measuring unit 413 makes the feature point of the 3-dimensional dot group 1403 and the feature point of the 3-dimensional dot group 1404 correspond to each other, calculates distances among all correspondence points, and adds. While moving the position of the 3-dimensional dot group 1404, the solid shape measuring unit 413 repetitively calculates the position where the sum of the distances among the correspondence points is minimum. When the number of repetition times reaches an upper limit or the position where the sum of the distances among the correspondence points is minimum is calculated, by moving the 3-dimensional dot group 1404 and, thereafter, overlaying with the 3-dimensional dot group 1403, the solid shape measuring unit 413 combines the two 3-dimensional dot groups 1403 and 1404. In this manner, the solid shape measuring unit 413 generates a 3-dimensional dot group 1406 after the combination and ends the 3-dimensional dot group combining process.

When the 3-dimensional dot group combining process of S1304 is ended, in S1305, the solid shape measuring unit 413 discriminates whether or not the turntable 209 has been rotated by one revolution. If the turntable 209 is not rotated by one revolution yet, the solid shape measuring unit 413 is returned to S1301, further rotates the turntable 209, subsequently, executes the process of S1302, and measures a 3-dimensional dot group of another angle. The solid shape measuring unit 413 executes a process for combining the 3-dimensional dot group 1406 which has already been combined in S1303 to S1304 and the 3-dimensional dot group which was newly measured. By repeating the processes of S1301 to S1305 as mentioned above until the turntable 209 is rotated by one revolution, the solid shape measuring unit 413 can generate 3-dimensional dot groups of the whole circumference of the target 1401.

If it is determined in S1305 that the turntable 209 has been rotated by one revolution, the solid shape measuring unit 413 advances to S1306 and executes a process for generating a 3-dimensional model from the generated 3-dimensional dot groups. When the 3-dimensional model generating process is started, in S1331, the solid shape measuring unit 413 performs a noise elimination and a smoothing from the 3-dimensional dot group.

In S1332, the solid shape measuring unit 413 generates a triangular patch from the 3-dimensional dot group, thereby meshing.

In S1333, the solid shape measuring unit 413 maps the texture stored in S1319 onto the plane obtained by meshing. The solid shape measuring unit 413 can generate a 3-dimensional model which was texture-mapped as mentioned above.

In S1307, the solid shape measuring unit 413 converts data after the texture mapping into a standard 3-dimensional model data format such as VRML, STL, or the like, stores into a predetermined area on the HDD 305 through the data managing unit 405, and ends the process.

(Description of Main Control Unit)

A process of a scan application which is executed by the main control unit 402 will be described by using a flowchart of FIG. 15.

In FIG. 15, when the process is started, in S1501, the main control unit 402 executes an object putting waiting process for waiting until a target of the scan is put onto the stage 204.

Figure 16A:
FIGS. 16A, 16B and 16C are diagrams illustrating an example of a projecting screen on a stage.

In S1501, when the object putting waiting process is started, in S1501, the main control unit 402 projects a display screen of FIG. 16A onto the stage 204 by the projector 207 through the user interface unit 403. In the display screen of FIG. 16A, a message 1601 for promoting the user to put a target onto the stage 204 is projected.

In S1512, the main control unit 402 activates the process of the object detecting unit 410. The object detecting unit 410 starts the execution of the processes described in the flowcharts of FIGS. 8A to 8C. In S1513, the main control unit 402 waits for an object putting notification from the object detecting unit 410. When the object detecting unit 410 executes the process of S827 in FIGS. 8A to 8C and notifies the main control unit 402 of the object putting, the main control unit 402 decides that there is the object putting notification in S1513, and ends the object putting waiting process.

Figure 16B:
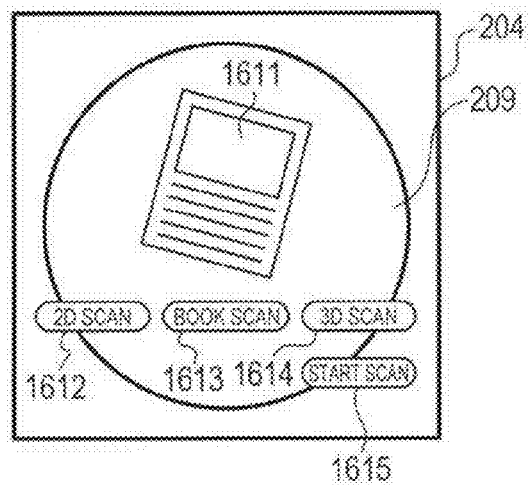

When the object putting waiting process of S1501 is ended, the main control unit 402 subsequently executes a scan executing process of S1502. When the scan executing process of S1502 is started, in S1531, the main control unit 402 projects a scan start display screen illustrated in FIG. 16B onto the stage 204 through the user interface unit 403. In FIG. 16B, a target 1611 is a scan target object put by the user. A 2D scan button 1612 is a button to receive a photographing instruction of a flat original. A book scan button 1613 is a button to receive a photographing instruction of a book original. A 3D scan button 1614 is a button to receive a measuring instruction of a solid shape. A scan start button 1615 is a button to receive an execution start instruction of the selected scan. The user interface unit 403 detects which one of the buttons has been depressed by the user from the coordinates of the touch gesture notified from the gesture recognizing unit 409 as mentioned above and the coordinates where those buttons are displayed. After that, a description of the detection by the user interface unit 403 is omitted and is disclosed as "touch to the button is detected". The user interface unit 403 can exclusively select each of the 2D scan button 1612, book scan button 1613, and 3D scan button 1614. When the user's touch to any one of the buttons is detected, the main control unit 402 sets the touched button into a selection state and cancels the selection of other buttons.

In S1532, the main control unit 402 waits until the touch to the scan start button 1615 is detected. When the touch to the scan start button 1615 is detected in S1532, the main control unit 402 advances to S1533 and discriminates whether or not the 2D scan button 1612 is in the selection state.

If the 2D scan button 1612 is in the selection state in S1533, the main control unit 402 advances to S1534, executes the process of the flat original image photographing unit 411, and ends the scan executing process.

If the 2D scan button 1612 is not in the selection state in S1533, the main control unit 402 advances to S1535 and discriminates whether or not the book scan button 1613 is in the selection state. If the book scan button 1613 is in the selection state in S1535, the main control unit 402 advances to S1536, executes the process of the book image photographing unit 412, and ends the scan executing process.

If the book scan button 1613 is not in the selection state in S1535, the main control unit 402 advances to S1537, and discriminates whether or not the 3D scan button 1614 is in the selection state. If the 3D scan button 1614 is in the selection state in S1537, the main control unit 402 advances to S1538, executes the process of the solid shape measuring unit 413, and ends the scan executing process. If the 3D scan button 1614 is not in the selection state in S1537, the main control unit 402 decides that each of the 2D scan button 1612, book scan button 1613, and 3D scan button 1614 is not in the selection state. Therefore, the main control unit 402 is returned to S1532 and waits until the touch to the scan start button 1615 is detected after any one of those buttons entered the selection state.

When the scan executing process of S1502 is ended, the main control unit 402 subsequently executes an object removal waiting process of S1503.

Figure 16C:
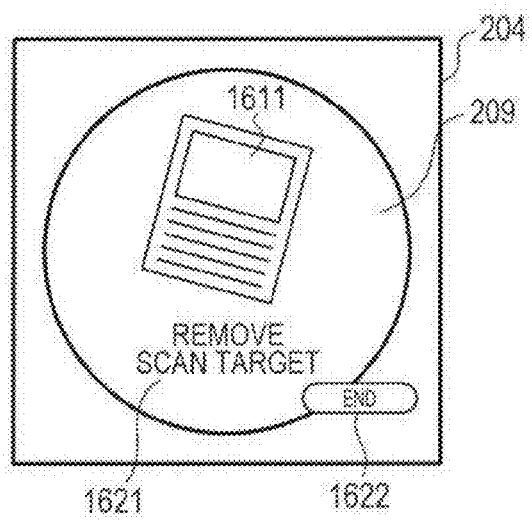

When the object removal waiting process of S1503 is started, in S1521, the main control unit 402 displays a scan end screen illustrated in FIG. 16C through the user interface unit 403. In the scan end screen in FIG. 16C, a message 1621 to notify the user that the scanned original is removed and an end button 1622 to receive a process end instruction from the main control unit 402 are projected.

In S1522, the main control unit 402 waits for a reception of an object removal notification from the object detecting unit 410. The object removal notification is notified by the object detecting unit 410 in S834 in FIGS. 8A to 8C. When there is the object removal notification in S1522, the main control unit 402 ends the object removal waiting process. When the object removal waiting process of S1503 is ended, in S1504, the main control unit 402 discriminates whether or not the end button 1622 has been touched during the execution of the object removal waiting process of S1503. If it is decided in S1504 that the end button 1622 has been touched, the main control unit 402 ends the process. If it is decided in S1504 that the end button 1622 is not touched, the main control unit 402 is returned to S1501, displays the initial screen of FIG. 16A through the user interface unit 403, and waits until the object is put onto the stage 204. By the above processes, when the user wants to scan a plurality of originals, the main control unit 402 can detect that the original on the stage 204 has been exchanged, and can execute the scan of the plurality of originals.

According to the embodiment 1 mentioned above, the user can select any one of a mode to scan the flat original, a mode to scan the thick book, and a mode to measure the solid shape. A case where all of the three kinds of scanning modes are unnecessary, for example, a case where it is sufficient to execute two kinds of the scan of the flat original and the scan of the thick book due to the setting or the like of the user is also considered. In such a case, it is sufficient that the main control unit 402 displays through the user interface unit 403 so that the two scans which are executed can be selected. More specifically speaking, the main control unit 402 projects only the 2D scan button 1612, book scan button 1613, and scan start button 1615 in FIG. 16B through the user interface unit 403. Thus, a user input for selecting one of the two kinds of scanning modes can be received. A case where it is sufficient that there is only one kind of scanning mode, for example, a case where it is sufficient to execute only the scan of the flat original or the scan of the book due to the setting or the like of the user is also considered. In this case, the main control unit 402 projects only the scan start button 1615 in FIG. 16B through the user interface unit 403. It is sufficient that the main control unit 402 executes the scan when the touch to the scan start button 1615 is detected without receiving the user's selection of the scan kind. In the case where there is only one kind of scanning mode as mentioned above, when the putting of the object onto the stage 204 is detected, the main control unit 402 may soon execute the scan through the scan processing unit 418 without projecting a scan operation display screen as shown in FIG. 16B.

Embodiment 2

Figure 17A:
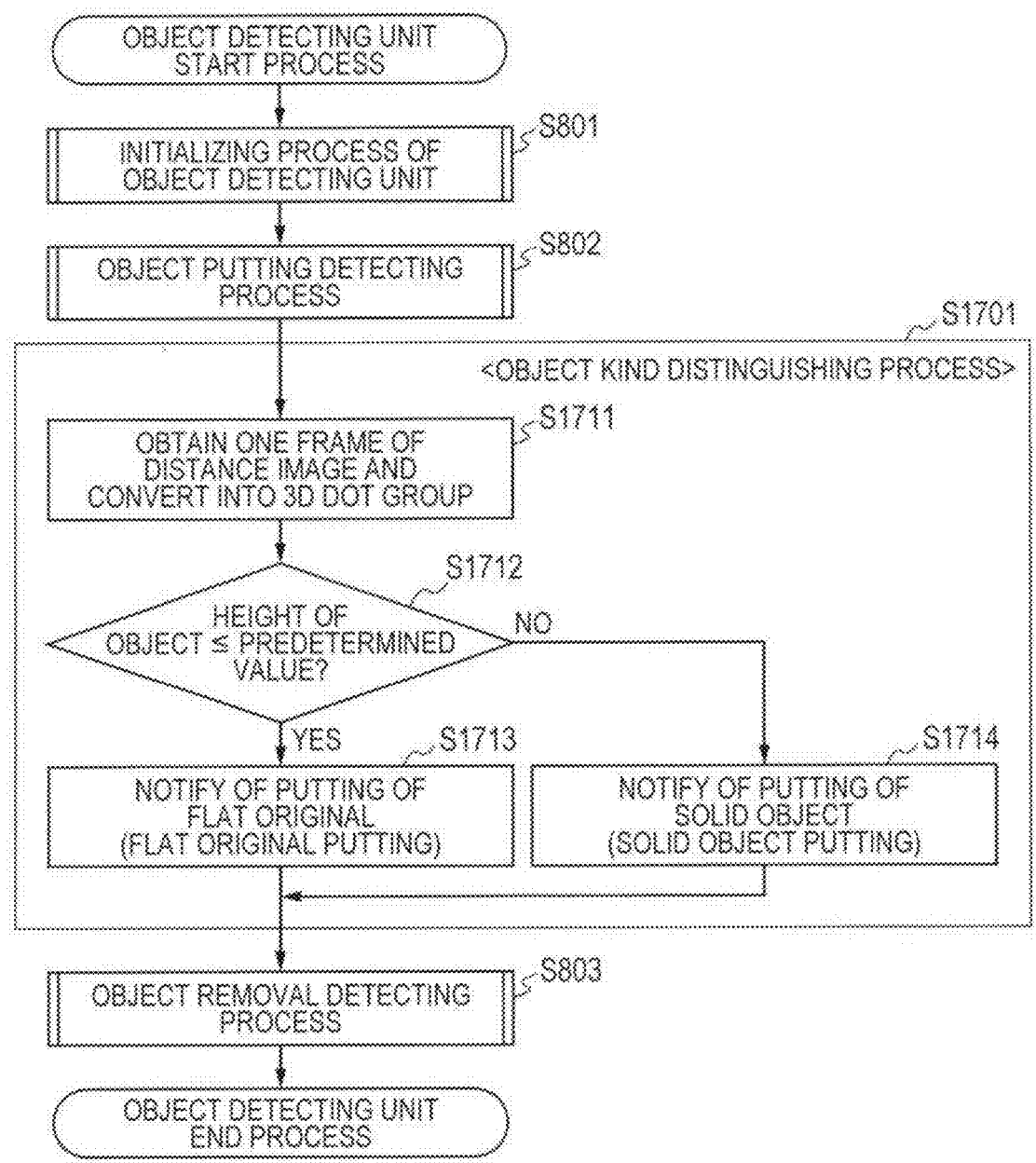
FIGS. 17A, 17B and 17C are a flowchart and the like illustrating an example of a process of an embodiment 2.

In the camera scanner 101 of the construction of the embodiment 1, the distance image sensor unit 208 can measure a shape of the object put on the stage 204. Therefore, in the embodiment 2, when the object is put on the stage 204, whether or not it is a flat object or a solid object is discriminated by using the distance image sensor unit 208 and a proper process is executed to each object, thereby improving the operability. In the embodiment 2, in the process of the functional construction 401 described in the embodiment 1, the processes of the flowcharts of FIGS. 8A to 8C which are executed by the object detecting unit 410 and the scan executing process which is executed by the main control unit 402 in S1502 in FIG. 15 differ. The different processes will be described by using FIGS. 17A to 17C. FIG. 17A is a flowchart illustrating an example of the process which is executed by the object detecting unit 410 in the embodiment 2. In this flowchart, to the flowchart of FIG. 8A, an object kind discriminating process of S1701 is added after the object detecting unit initializing process of S801 and the object putting detecting process of S802. The object detecting unit 410 executes the object removal detecting process of S803 and ends the process. The processes of S801, S802, and S803 are the same as the process of the object detecting unit 410 described in FIGS. 8A to 8C.

When the object kind discriminating process of S1701 is started, in S1711, the object detecting unit 410 obtains one frame of the distance image through the distance image obtaining unit 408 and converts into the 3-dimensional dot group.

In S1712, the object detecting unit 410 obtains a height of the dot, as a height of the object, in which the height from the stage plane is maximum among the 3-dimensional dot groups included in the object on the stage 204 and discriminates whether or not the obtained height is equal to or less than a predetermined value.

If the height of the object is equal to or less than the predetermined value in S1712, the object detecting unit 410 advances to S1713 and notifies the main control unit 402 that the flat original was put onto the stage 204. If the height of the object is larger than the predetermined value in S1712, the object detecting unit 410 advances to S1714 and notifies the main control unit 402 that the solid object was put onto the stage 204.

After either S1713 or S1714 was executed, the object detecting unit 410 ends the object kind discriminating process.

As mentioned above, in the process which is executed by the main control unit 402 in the embodiment 2, details of the scan executing process of S1502 merely differ in the flowchart of FIG. 15 in the embodiment 1.

Figure 17B:
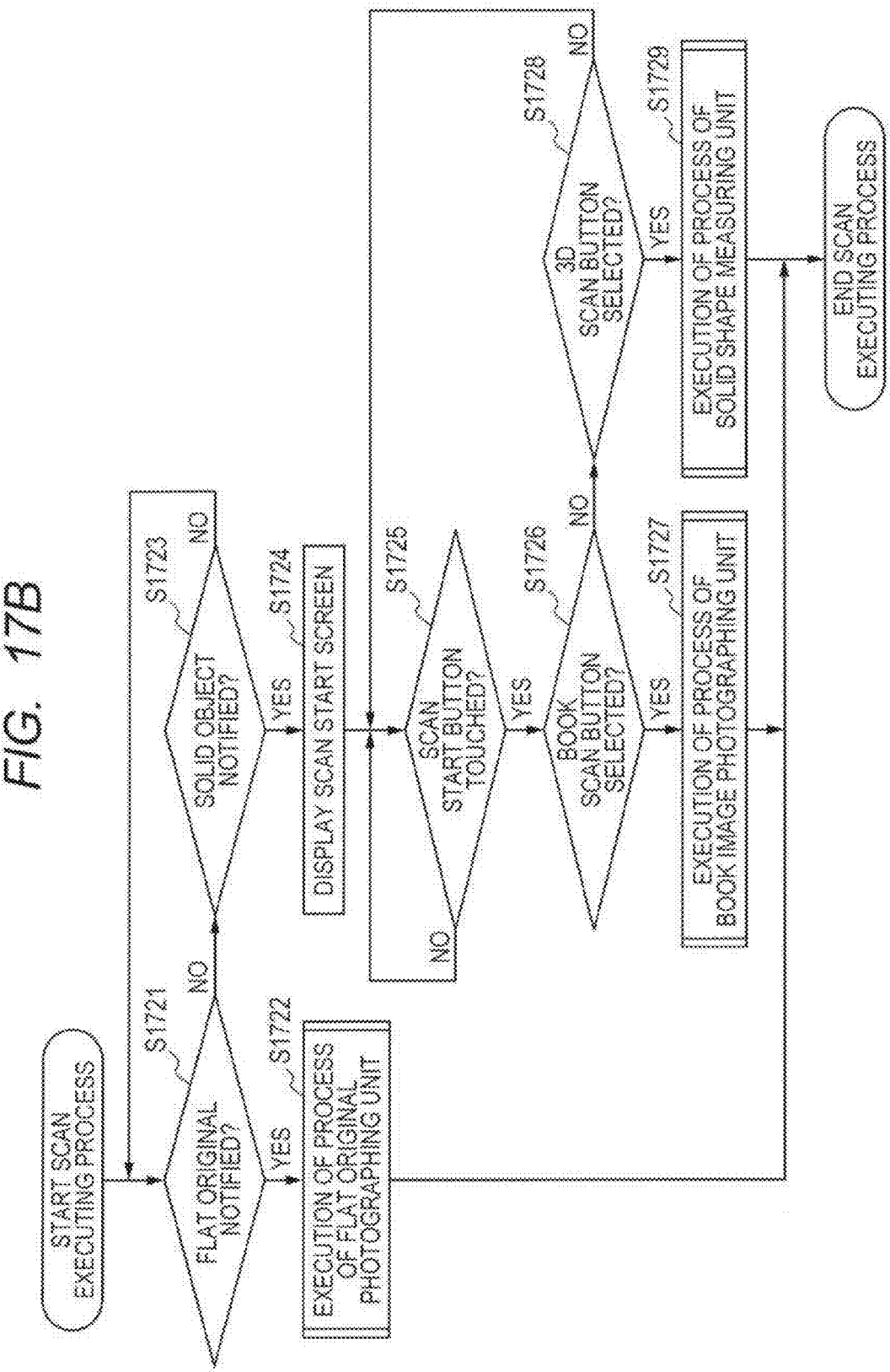

Therefore, the details of the scan executing process which is executed by the main control unit 402 in the embodiment 2 will be described by using a flowchart of FIG. 17B.

When the scan executing process of S1502 is started, in S1721, the main control unit 402 discriminates whether or not a fact that the flat original was put has been notified from the object detecting unit 410. If the putting of the flat original is not notified in S1721, the main control unit 402 advances to S1723 and discriminates whether or not a fact that the solid object was put has been notified from the object detecting unit 410. If the putting of the solid object is not notified in S1723, the main control unit 402 is returned to S1721 and waits until the notification of the putting of the flat original or the notification of the putting of the solid object is received. When the object detecting unit 410 executes S1713 in FIG. 17A and notifies the main control unit 402 that the flat original was put, the main control unit 402 decides that there is the notification showing that the flat original was put in S1721, and advances to S1722. In S1722, the main control unit 402 executes the process of the flat original image photographing unit 411. When the object detecting unit 410 executes S1714 in FIG. 17A and notifies the main control unit 402 that the solid object was put, the main control unit 402 decides that there is the notification showing that the solid object was put in S1723, and advances to S1724. The main control unit 402 projects a scan start display screen illustrated in FIG. 17C to the stage 204 through the user interface unit 403.

Figure 17C:
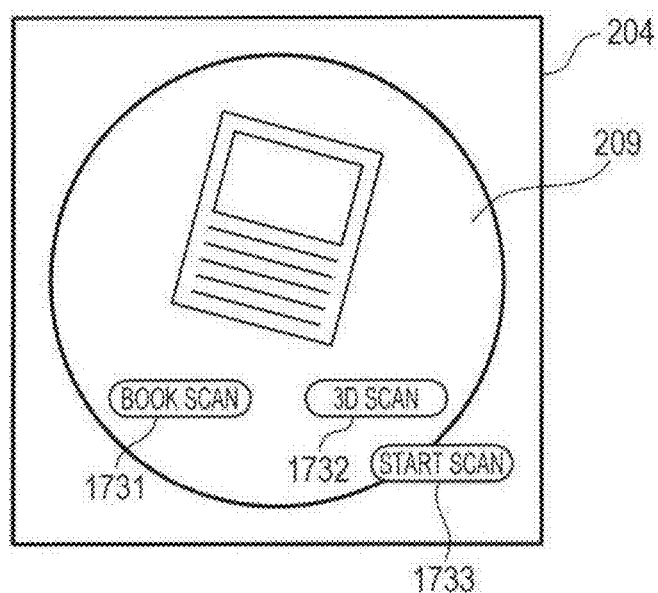

In the scan start screen in FIG. 17C, a book scan button 1731, a 3D scan button 1732, and a scan start button 1733 are projected. The book scan button 1731 and the 3D scan button 1732 are buttons for receiving the selection of the scanning mode. When a touch to either one of those buttons is detected, the user interface unit 403 sets the touched button into the selection state and sets the other button into the non-selection state. The scan start button 1733 is a button for receiving a scan start instruction.

In S1725, the main control unit 402 waits until a touch to the scan start button 1733 is detected. When the touch to the scan start button 1733 is detected in S1725, the main control unit 402 advances to S1726 and discriminates whether or not the book scan button 1731 is in the selection state.

If the book scan button 1731 is in the non-selection state in S1726, the main control unit 402 advances to S1728 and discriminates whether or not the 3D scan button 1732 is in the selection state. If the main control unit 402 determines that the 3D scan button 1732 is in the non-selection state in S1728, this means that the touch to each of the book scan button 1731 and the 3D scan button 1732 is not detected. Therefore, the main control unit 402 is returned to S1725 and waits until the touch to the scan start button 1733 is detected.

In S1726, if the book scan button 1731 is in the selection state, the main control unit 402 advances to S1727 and executes the process of the book image photographing unit 412.

In S1728, if the 3D scan button 1732 is in the selection state, the main control unit 402 advances to S1729 and executes the process of the solid shape measuring unit 413.

When any one of the three processes of the process of the flat original image photographing unit in S1722, the process of the book image photographing unit in S1727, and the process of the solid shape measuring unit in S1729 is executed, the main control unit 402 ends the scan executing process.

As mentioned above, in the object detecting unit 410, by discriminating whether or not the flat original has been put or the solid object has been put, at the time of the scan executing process, if the flat original was put, the user can scan the flat original without selecting the scanning mode and the operability is improved. Even if the solid object was put, by presenting the button for selecting the book scan and the button for selecting the 3D scan to the user, the user can select the proper scanning mode.

When the user does not need to execute either the book scan or the 3D scan, it is sufficient that the user interface unit 403 projects only the scan start button 1733 in the display screen of FIG. 17C. The scan can be also executed without displaying the scan operation screen. For example, when it is necessary to execute only two kinds of scans of the flat original scan and the book scan, if it is decided that there is the solid object notification in S1723 in FIG. 17B, it is sufficient that the main control unit 402 executes the process of the book image photographing unit. By executing the processes as mentioned above, the user can scan the flat original and the book original without operating the scan operation screen.

Embodiment 3

In the embodiment 2, when the solid object is put onto the stage 204, the user interface unit 403 presents the selection items about whether the book scan is executed or the 3D scan is executed to the user as illustrated in FIG. 17C. In both of the flat original and the book, although the main scan target is a document, when considering such a situation that a target which is used to measure a solid shape is an object other than the book in many cases, it is considered that the operability is improved by presenting the selection items about the book scan or the 3D scan to the user. In the embodiment 3, in the processes of the functional construction 401 described in the embodiment 2, the scan executing process which is executed in S1502 in FIG. 15 by the main control unit 402 differs. The different processes will now be described by using FIGS. 18A and 18B.

Figure 18A:
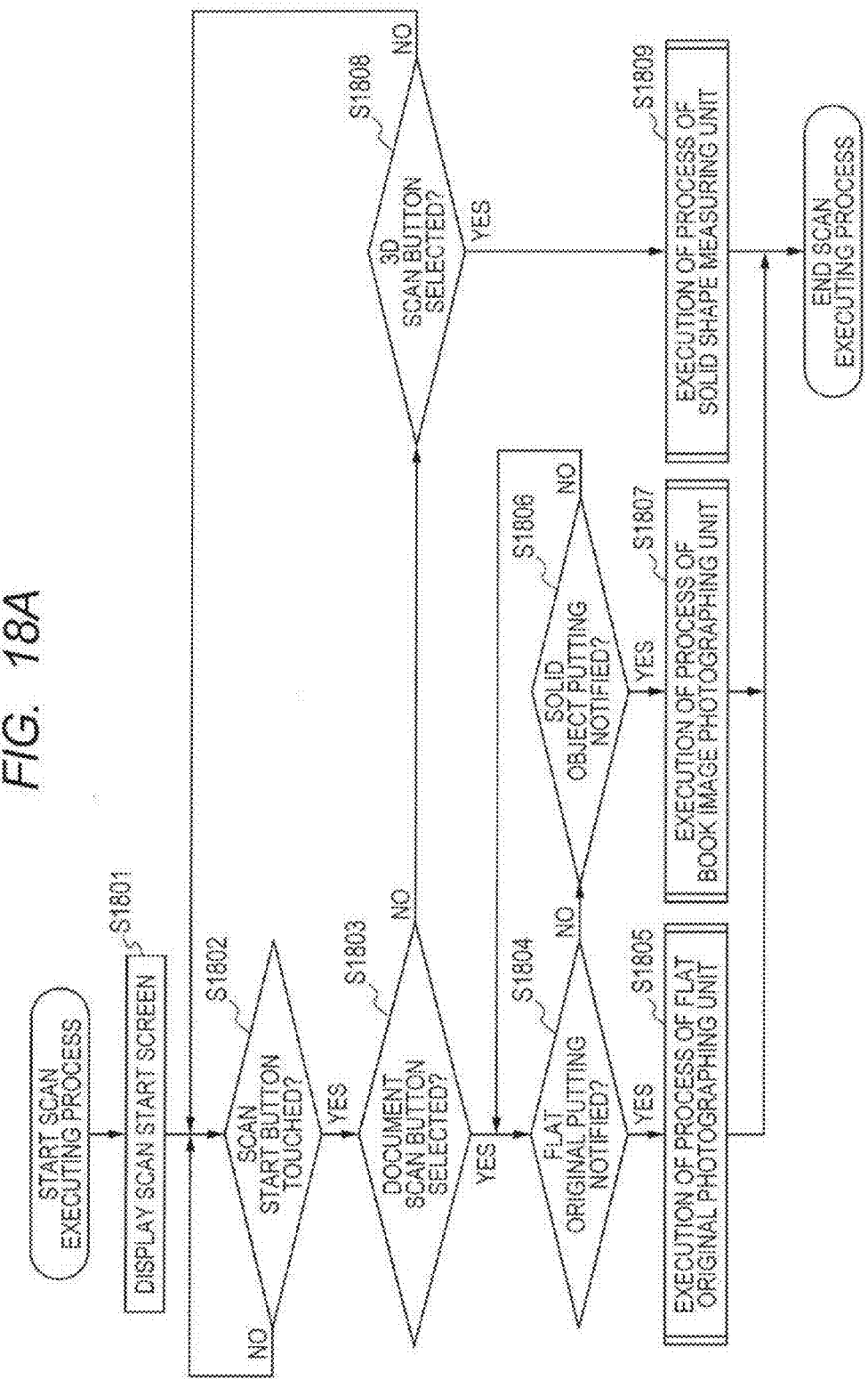
FIGS. 18A and 18B are a flowchart and the like illustrating an example of a process of an embodiment 3.

FIG. 18A is a flowchart illustrating an example of the scan executing process which is executed by the main control unit 402 in the embodiment 3.

Figure 18B:
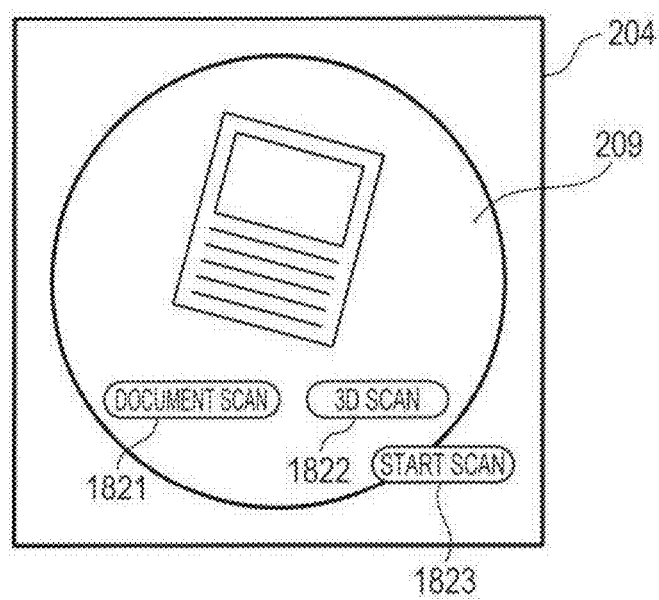

When the scan executing process is started, in S1801, the main control unit 402 projects a scan start display screen illustrated in FIG. 18B onto the stage 204 through the user interface unit 403. In the scan start screen in FIG. 18B, a document scan button 1821, a 3D scan button 1822, and a scan start button 1823 are projected. The document scan button 1821 and the 3D scan button 1822 are buttons for receiving the selection of the scanning mode. When a touch to either one of those buttons is detected, the user interface unit 403 sets the touched button into the selection state and sets the other button into the non-selection state. The scan start button 1823 is a button for receiving a scan start instruction.

In S1802, the main control unit 402 waits until a touch to the scan start button 1823 is detected. When the touch to the scan start button 1823 is detected in S1802, the main control unit 402 advances to S1803 and discriminates whether or not the document scan button 1821 is in the selection state.

If the document scan button 1821 is not in the selection state in S1803, the main control unit 402 advances to S1808 and discriminates whether or not the 3D scan button 1822 is in the selection state.

If the main control unit 402 determines that the 3D scan button 1822 is not in the selection state in S1808, this means that the touch to each of the document scan button 1821 and the 3D scan button 1822 is not detected and both of those buttons are not set in the selection state. Therefore, the main control unit 402 is returned to S1802, receives the selection of either the document scan button 1821 or the 3D scan button 1822, and waits until the touch to the scan start button 1823 is detected.

In S1803, if the document scan button 1821 is in the selection state, the main control unit 402 advances to S1804 and discriminates whether or not there is the flat original putting notification from the object detecting unit 410.

If there is no flat original putting notification in S1804, the main control unit 402 advances to S1806 and discriminates whether or not there is the solid object putting notification.

If there is no solid object putting notification in S1806, the main control unit 402 is returned to S1804 and waits for either the flat original putting notification or the solid object putting notification. If it is determined that there is the flat original putting notification in S1804, the main control unit 402 advances to S1805 and executes the process of the flat original image photographing unit 411.

If it is determined that there is the solid object putting notification in S1806, the main control unit 402 advances to S1807, interprets that a process for scanning the solid object as a document has been instructed from the user, and executes the process of the book image photographing unit 412.

If the 3D scan button 1822 is in the selection state in S1808, the main control unit 402 advances to S1809 and executes the process of the solid shape measuring unit 413.

After the execution of the process of one of S1805, S1807, and S1809 was ended, the main control unit 402 ends the scan executing process.

By presenting the document scan or the 3D scan as a selection item of the scanning mode to the user as mentioned above, the user can execute the operation matched with a purpose for scanning the document or measuring the solid object and the operability is improved. When the main control unit 402 detects the selection of the document scan, if the solid object was put on the stage 204, by executing the process of the book image photographing unit 412, the document image subjected to the proper distortion correction can be obtained.

Embodiment 4

In the embodiments 2 and 3, the main control unit 402 discriminates whether or not the target put on the stage 204 is the flat original or the solid object and, thereafter, executes the process. In the embodiment 4, when it is determined that the target put on the stage 204 is the solid object, the main control unit 402 discriminates whether or not the target is a book, and executes the process. In the embodiment 4, since details of the object kind discriminating process of S1701 in FIGS. 17A to 17C and the scan executing process of S1502 in FIG. 15 differ from those in the embodiments 2 and 3, different points will be described. FIG. 19 is a flowchart illustrating an example of the object kind discriminating process which is executed by the object detecting unit 410 of the embodiment 4. When the object kind discriminating process is started, in S1901, the object detecting unit 410 obtains one frame of the distance image through the distance image obtaining unit 408 and converts into a 3-dimensional dot group.

In S1902, the object detecting unit 410 obtains a height of the dot, as a height of the object, in which the height from the stage plane is maximum among the 3-dimensional dot groups included in the object on the stage 204, and discriminates whether or not the obtained height is equal to or smaller than a predetermined value. If the height of the object is equal to or less than the predetermined value in S1902, the object detecting unit 410 advances to S1903 and notifies the main control unit 402 that the flat original was put on the stage 204. If the height of the object is larger than the predetermined value in S1902, the object detecting unit 410 advances to S1904 and discriminates whether or not the solid object put on the stage 204 is the book. The process of S1904 will be described hereinafter.

In S1905, the object detecting unit 410 discriminates whether or not it was decided that the solid object is the book in S1904. If it is determined in S1905 that the solid object is the book, the object detecting unit 410 advances to S1906 and notifies the main control unit 402 that the book was put on the stage 204. If it is determined in S1905 that the solid object is not the book, the object detecting unit 410 advances to S1907 and notifies the main control unit 402 that the solid object was put on the stage 204.

After any one of S1903, S1906, and S1907 was executed, the object detecting unit 410 ends the object kind discriminating process.

Subsequently, details of the book discriminating process of S1904 will be described.

When the book discriminating process is started in S1904, the object detecting unit 410 advances to S1911, projective-transforms the target into the stage plane, and discriminates whether or not the target image is close to a rectangle when viewed from directly above the stage plane. The discrimination here is made by a method whereby a circumscribed rectangle of the target image after the projective transformation is calculated, if a difference between an area of the circumscribed rectangle and an area of the target image is equal to or less than a predetermined value, it is decided that the target image is close to the rectangle, and if it is larger than the predetermined value, it is decided that the target image is not close to the rectangle.

If it is decided that the target image is not close to the rectangle in S1911, the object detecting unit 410 advances to S1915 and determines that the target is other than the book. If it is decided that the target image is close to the rectangle in S1911, the object detecting unit 410 advances to S1912 and discriminates whether or not a ratio between the area of the target viewed from directly above the stage plane and the height of the target from the stage plane is equal to or less than a predetermined value, that is, whether or not the target image is close to a flat shape.

If it is decided that the target image is not close to the flat shape in S1912, the object detecting unit 410 advances to S1915 and determines that the target is other than the book. If it is decided that the target image is close to the flat shape in S1912, the object detecting unit 410 advances to S1913 and discriminates whether or not characters are included on the surface of the target by using an OCR technique.

If it is decided that no characters are included in S1913, the object detecting unit 410 advances to S1915 and determines that the target is other than the book. If it is decided that the characters are included in S1913, the object detecting unit 410 advances to S1914, determines that the target is the book, and ends the book discriminating process.

In the book discriminating process of S1904, it is not always necessary that the object detecting unit 410 has to execute all of the discriminating processes of S1911 to S1913. For example, the object detecting unit 410 may execute one or a combination of an arbitrary plurality of discriminating processes among the discriminating processes of S1911 to S1913. Conditions in the discriminating processes of S1911 to S1913 are an example of the book discriminating conditions and may be conditions other than the conditions shown here.

Figure 20A:
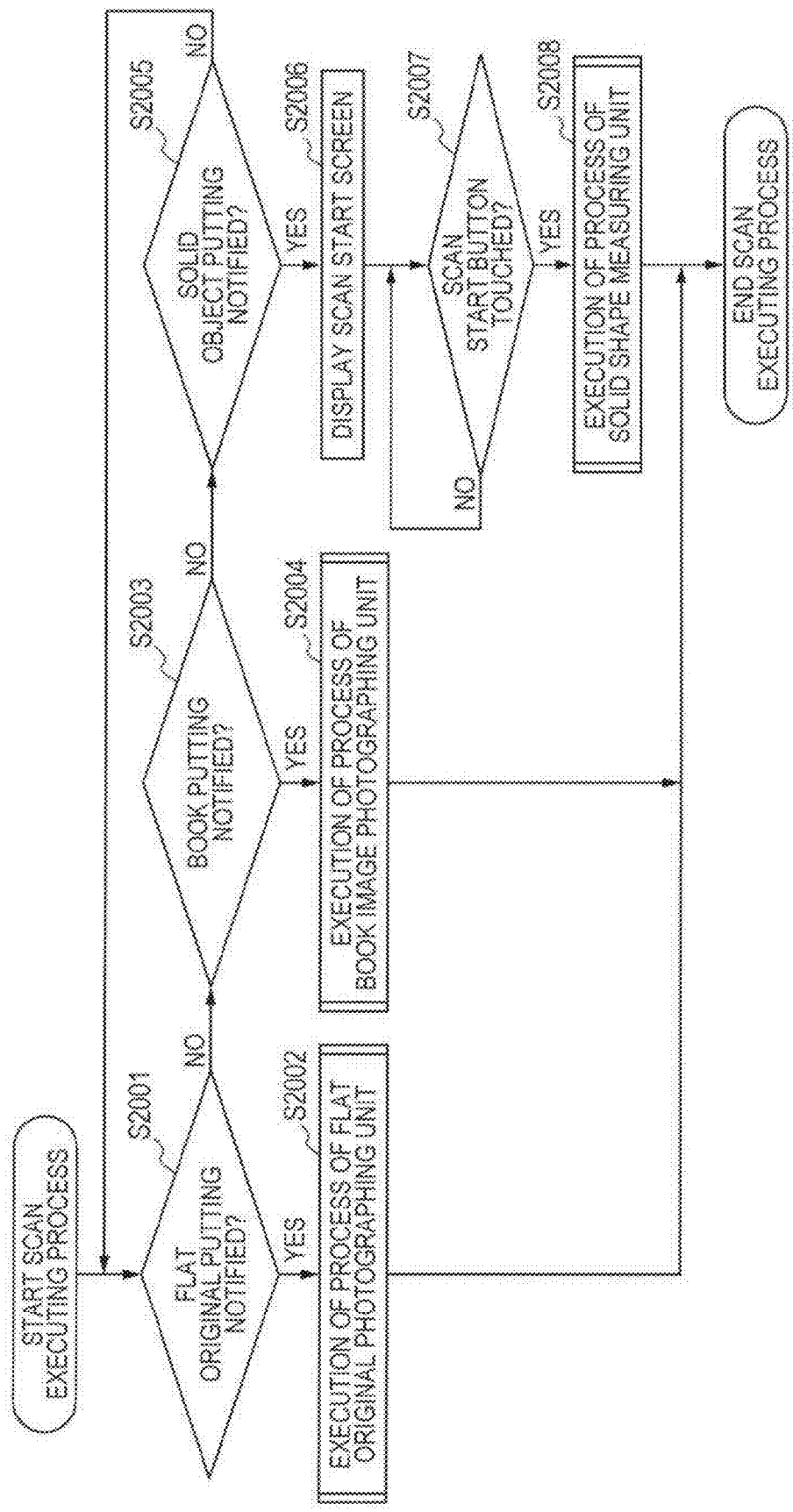
FIGS. 20A and 20B are a flowchart and the like illustrating an example of a process of a main control unit of the embodiment 4.

FIG. 20A is a flowchart illustrating an example of the process at the time when the main control unit 402 in the embodiment 4 executes the scan executing process of S1502 described in FIG. 15.

When the scan executing process is started, in S2001, the main control unit 402 discriminates whether or not there is the flat original putting notification from the object detecting unit 410. If it is determined that there is no flat original putting notification in S2001, the main control unit 402 advances to S2003 and discriminates whether or not there is the book putting notification from the object detecting unit 410. If it is determined that there is no book putting notification in S2003, the main control unit 402 advances to S2005 and discriminates whether or not there is the solid object putting notification. If it is determined that there is no solid object putting notification in S2005, the main control unit 402 is returned to S2001 and waits for reception of one of the flat original putting notification, book putting notification, and solid object putting notification from the object detecting unit 410.

If it is determined that there is the flat original putting notification in S2001, the main control unit 402 advances to S2002 and executes the process of the flat original image photographing unit 411. If it is determined that there is the book putting notification in S2003, the main control unit 402 advances to S2004 and executes the process of the book image photographing unit 412.

Figure 20B:
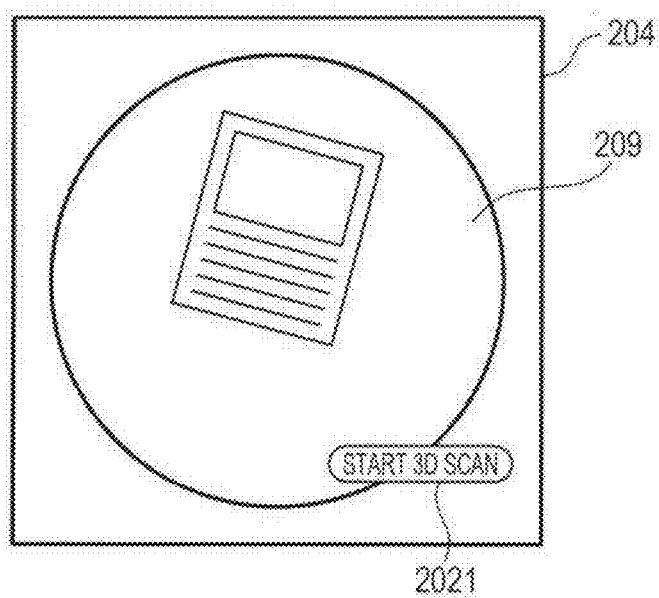

If it is determined that there is the solid object putting notification in S2005, the main control unit 402 executes the process of the solid shape measuring unit 413. However, in the process of the solid shape measuring unit 413, since the shape measurement is performed a plurality of number of times while rotating the turntable by one revolution, it takes a long time. Therefore, if the user can explicitly instruct the start of the process of the solid shape measuring unit 413, it is desirable from a viewpoint of the operability. Therefore, in S2006, the main control unit 402 projects a display screen illustrated in FIG. 20B through the user interface unit 403. In FIG. 20B, a 3D scan start button 2021 is a button for receiving a 3D scan start instruction.

In S2007, the main control unit 402 waits until a touch to the 3D scan start button 2021 is detected. When the touch to the 3D scan start button 2021 is detected in S2007, the main control unit 402 advances to S2008 and executes the process of the solid shape measuring unit 413.

After the execution of the process of any one of S2002, S2004, and S2008 was ended, the main control unit 402 ends the scan executing process.

The object detecting unit 410 discriminates whether or not the object put on the stage 204 is the flat original, book, or solid object as mentioned above, so that the proper scanning process can be executed at the time of the execution of the scan. As for the processes of the flat original image photographing unit 411 and the book image photographing unit 412 which do not require a relatively long time, by executing them without waiting for the scan start instruction from the user after the object was put, the scan can be rapidly executed. On the other hand, as for the process of the solid shape measuring unit 413 which requires a relatively long time, by starting the execution of the process after waiting for the user's start instruction, the operability of the user can be improved.

Embodiment 5

In the embodiment 1, the solid shape measuring unit 413 executes the measurement of the solid shape of the target on the turntable 209 by the camera unit 202 and the projector 207. In the process of the solid shape measuring unit 413, the positions of the camera unit 202 and the projector 207 are fixed and by measuring the solid shape a plurality of number of times while rotating the turntable 209, a measuring accuracy is raised with respect to the side surface of the target. However, when the height of the target is equal to or larger than the height of the camera unit 202, there is a possibility that a measuring accuracy of the upper surface deteriorates. Since the distance image sensor unit 208 is disposed at an upper position than the camera unit 202 as illustrated in FIG. 2A, the upper surface of the target can be precisely measured. In the embodiment 5, in addition to the solid shape measurement by the camera unit 202 and the projector 207, by also adding the solid shape measurement by the distance image sensor unit 208, the measuring accuracy is improved.

Figure 21:
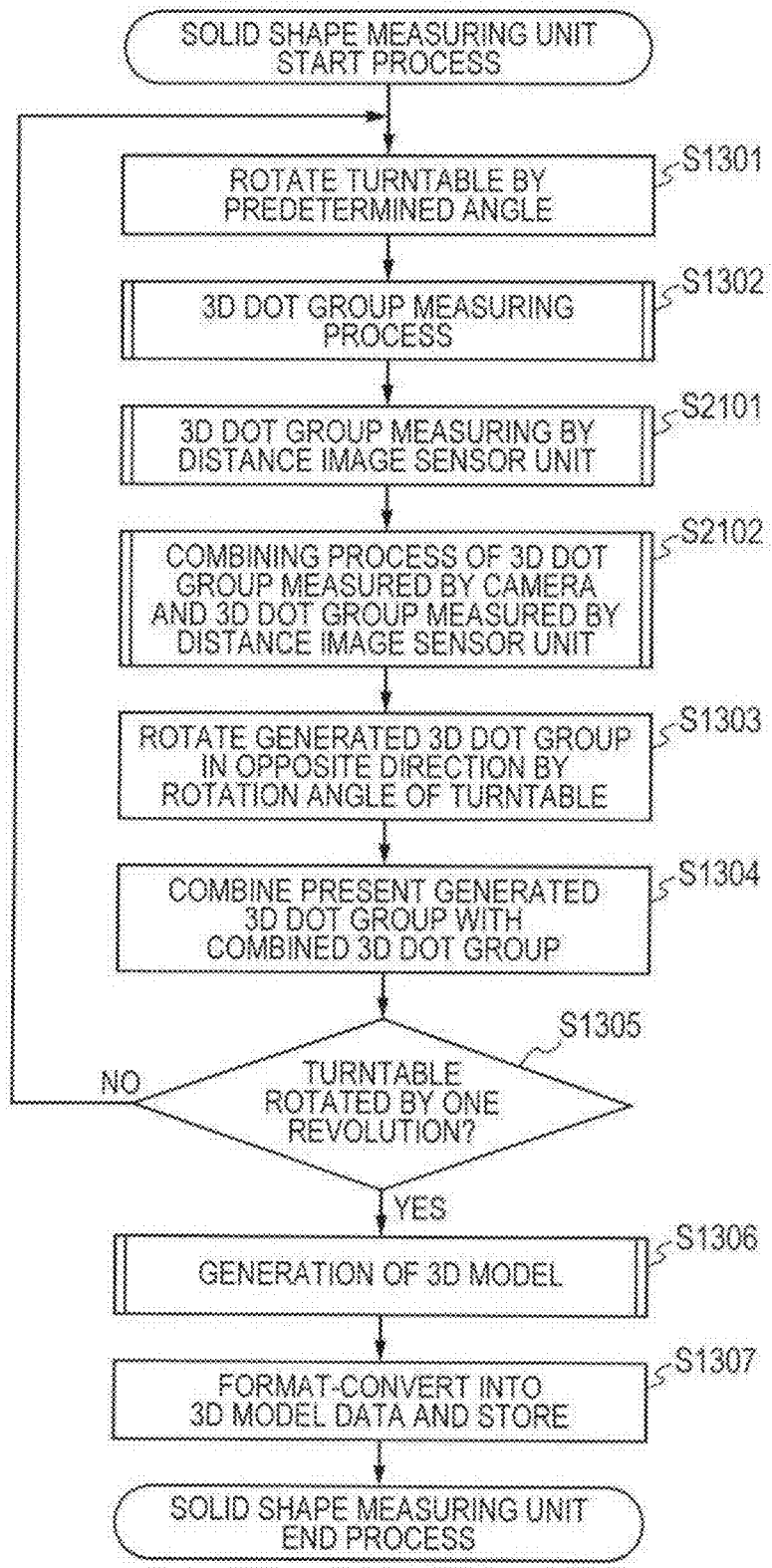
FIG. 21 is a flowchart illustrating an example of a process of an embodiment 5.

An example of the process of the solid shape measuring unit 413 in the embodiment 5 is illustrated in a flowchart of FIG. 21. The flowchart of FIG. 21 is constructed by adding S2101 and S2102 to the flowchart of FIG. 13A and the same processes as those in FIG. 13A are designated by the same step numbers. A description about the same processes as those in FIG. 13A will be simply performed.

In S1301, the solid shape measuring unit 413 rotates the turntable by a predetermined angle.

In S1302, the solid shape measuring unit 413 performs the 3-dimensional dot group measurement by the camera unit 202 and the projector 207.

In S2101, the solid shape measuring unit 413 executes the process of the distance image obtaining unit 408 described in FIGS. 5A to 5D, obtains a distance image of the coordinate system of the distance image sensor unit 208, converts it into the 3-dimensional dot group of the orthogonal coordinate system, and performs the 3-dimensional dot group measurement by the distance image sensor unit 208.

In S2102, the solid shape measuring unit 413 forms one 3-dimensional dot group by combining the 3-dimensional dot group measured in S1301 and the 3-dimensional dot group measured in S2101 by using the ICP algorithm described in the embodiment 1. By executing the processes as mentioned above, a 3-dimensional dot group in which the measuring accuracies of both of the side surface and the upper surface of the target are high can be obtained.

In S1303, the solid shape measuring unit 413 rotates the 3-dimensional dot group combined in S2102 in the opposite direction by the rotation angle from the initial position of the turntable. In S1304, the solid shape measuring unit 413 further executes the combining process with the 3-dimensional dot group combined so far.

In S1305, the solid shape measuring unit 413 discriminates whether or not the turntable has been rotated by one revolution, and repeats the processes of S1301 to S1304 until it is rotated by one revolution. If it is determined that the turntable has been rotated by one revolution in S1305, the solid shape measuring unit 413 advances to S1306, executes the 3-dimensional model generating process, format-converts the 3-dimensional model data calculated in S1307, stores, and ends the process.

As mentioned above, in addition to the solid shape measuring process by the camera unit 202 and the projector 207, the solid shape measuring process by the distance image sensor unit 208 is executed and, subsequently, by combining their measurement results, the more accurate solid shape measurement can be performed.

Other Embodiments

According to each of the foregoing embodiments, the user's operability in the image processing apparatus such as a camera scanner or the like can be improved. More specifically speaking, the projection of the user interface by the projector, the gesture recognition by the distance image sensor, and the detection of the object on the stage can be performed and the following three kinds of reading operations can be performed.

(1) Reading of the flat original by the camera
(2) Reading of the thick document by the camera and distortion correction by the distance image sensor
(3) Projection of the 3-dimensional measurement patterns by the projector and solid shape measurement by the camera Therefore, it is sufficient that the user puts the target onto the stage and operates the user interface which is projected onto the stage. The user can completely perform the work on the stage, and the operability can be largely improved.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-095535, filed May 2, 2014, which is hereby incorporated by reference herein in its entirety.

REFERENCE SIGNS LIST 101 camera scanner
201 controller unit
202 camera unit
204 stage
207 projector
208 distance image sensor unit

The invention claimed is:

1. An image processing apparatus comprising:
a projector configured to project an image on a stage;
a camera configured to capture an image on the stage;
a distance sensor configured to obtain a distance image;
at least one processor configured to implement instructions stored in at least one memory and execute a plurality of tasks, including:
a detecting task that detects an object place on the stage from the captured image;
a projecting task that controls the projector to project an operation display item regarding a reading of the object placed onto the stage according to the detecting task detecting the object placed on the stage;
a recognizing task that recognizes a gesture of a user on the stage from the obtained distance image; and
a reading task that obtains a read image of the object in accordance with the gesture recognized by the recognizing task to the operation item projected by the projector.

2. The image processing apparatus according to claim 1, wherein:
the projecting task projects the operation item for selecting a reading mode according to a shape of the object, and
the reading task obtains the read image of the object in the reading mode shown by the operation item selected by the gesture.

3. The image processing apparatus according to claim 1, wherein the reading task reads the object in one of a reading mode for reading a flat original, a reading mode for reading a book, or a reading mode for reading a solid object, and obtain the read image.

4. The image processing apparatus according to claim 3, wherein in a case of the reading mode for reading a flat original, the reading task extracts the read image from the captured image including the object, and obtain the read image.

5. The image processing apparatus according to claim 3, wherein in a case of the reading mode for reading a book, the reading task extracts the read image from the captured image including the object and corrects a distortion on the basis of the distance image including the object, and obtain the read image.

6. The image processing apparatus according to claim 3, wherein in the case of the reading mode for reading the solid object, the reading task projects a solid shape measurement pattern onto the object through the projector while rotating the object by a turntable constructing the stage and combines a plurality of solid data obtained by reading the projected solid shape measurement pattern, and obtain the read image.

7. The image processing apparatus according to claim 6, wherein the reading task combines the solid data obtained by reading the projected solid shape measurement pattern and solid data of the object obtained through a solid measuring unit disposed at a position different from that of the camera, and obtain the read image.

8. The image processing apparatus according to claim 3, wherein:
the plurality of tasks includes a discriminating task that discriminates the shape of the object on the basis of the distance image of the object obtained by the distance-sensor, and
the projecting task projects the operation item for selecting the reading mode according to the shape of the object on the basis of a result of the discrimination by the discriminating task.

9. The image processing apparatus according to claim 8, wherein in a case where the discriminating task discriminates the object as a solid object, the projecting task projects the operation item for selecting the reading mode of a book or the reading mode of a solid object.

10. The image processing apparatus according to claim 8, wherein:
as the reading mode of an object, the projecting task projects the operation item for selecting the reading mode of a solid object or a reading mode of a document, and
when the reading mode of the document is selected and in a case where the discriminating task discriminates the object as:
a flat original, the reading task reads the object in the reading mode for reading a flat original, and obtains the read image; and
a solid object, the reading task reads the object in the reading mode for reading a book, and obtains the read image.

11. The image processing apparatus according to claim 8, wherein in a case where the discriminating task discriminates the object as a solid object that is not a book, the projecting task projects the operation item for executing the reading in the reading mode for reading a solid object.

12. The image processing apparatus according to claim 8, wherein in a case where the discriminating task discriminates the object as a flat original or a book, the reading task obtains the read image of the object without waiting for the recognition of the gesture.

13. The image processing apparatus according to claim 8, wherein:
when a height of the object shown by the distance image of the object is equal to or less than a predetermined height, the discriminating discriminates the object as a flat original;
when the height of the object is higher than the predetermined height, the discriminating task discriminates the object as a solid object; and; and
when the object is discriminated as a solid object and a predetermined book discriminating condition is satisfied, the discriminating discriminates the object as a book.

14. The image processing apparatus according to claim 1, wherein when a difference value between the captured image including the object obtained by the camera and a captured image of a background of the stage is equal to or larger than a predetermined threshold value, the detecting task detects a putting of the object on the stage.

15. The image processing apparatus according to claim 1, wherein the recognizing task recognizes the gesture of the user on the basis of a shape and a position of a hand of the user detected from the distance image obtained by the distance sensor.

16. The image processing apparatus according to claim 1, wherein the image processing apparatus is a camera scanner.

17. An information processing method executed by an image processing apparatus, the method comprising:
an image capturing step of capturing an image on a stage with a camera;
a distance image obtaining step of obtaining a distance image with a distance sensor;
a detecting step of detecting an object placed on the stage from the captured image;
a projecting step of projecting, with a projector, an operation item regarding a reading of the object placed onto the stage according to the detection of the object placed on the stage in the detecting step;
a recognizing step of recognizing a gesture of a user on the stage from the distance image obtained in the distance image obtaining step; and
a reading step of obtaining a read image of the object in accordance with the gesture recognized by the recognizing step to the operation item projected by the projecting step.

18. A non-transitory computer-readable storage medium storing a program executable by a computer to execute a method comprising:
an image capturing step of capturing an image on a stage with a camera;
a distance image obtaining step of obtaining a distance image with a distance sensor;
a detecting step of detecting an object placed on the stage from the captured image;
a projecting step of projecting, with a projector, an operation item regarding a reading of the object placed onto the stage according to the detection of the object placed on the stage in the detecting step;
a recognizing step of recognizing a gesture of a user on the stage from the distance image obtained in the distance image obtaining step; and
a reading step of obtaining a read image of the object in accordance with the gesture recognized by the recognizing step to the operation item projected by the projecting step.

* * * * *